(12) United States Patent
Hori et al.

(10) Patent No.: US 10,649,633 B2
(45) Date of Patent: May 12, 2020

(54) IMAGE PROCESSING METHOD, IMAGE PROCESSING APPARATUS, AND NON-TRANSITORY COMPUTER-READABLE STORAGE MEDIUM

(71) Applicant: CANON KABUSHIKI KAISHA, Tokyo (JP)

(72) Inventors: Shinjiro Hori, Yokohama (JP); Hiroyasu Kunieda, Yokohama (JP); Ryosuke Iguchi, Inagi (JP); Masaaki Obayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 15/832,495

(22) Filed: Dec. 5, 2017

(65) Prior Publication Data
US 2018/0164964 A1  Jun. 14, 2018

(30) Foreign Application Priority Data
Dec. 9, 2016  (JP) .................. 2016-239739

(51) Int. Cl.
| G06K 9/46 | (2006.01) |
| G06F 3/0483 | (2013.01) |
| G06T 11/60 | (2006.01) |
| G06F 16/583 | (2019.01) |
| G06Q 50/00 | (2012.01) |

(52) U.S. Cl.
CPC ............ *G06F 3/0483* (2013.01); *G06K 9/46* (2013.01); *G06T 11/60* (2013.01); *G06F 16/583* (2019.01); *G06Q 50/01* (2013.01); *G06T 2207/30201* (2013.01)

(58) Field of Classification Search
None
See application file for complete search history.

(56) References Cited

U.S. PATENT DOCUMENTS

| 9,292,760 B2* | 3/2016 | Sumi .................. G06K 9/46 |
| 9,846,681 B2* | 12/2017 | Hashii ................ G06F 16/958 |
| 2011/0029552 A1 | 2/2011 | Whitby et al. |

FOREIGN PATENT DOCUMENTS

| EP | 2996319 A2 | 3/2016 |
| JP | 2014016825 A | 1/2014 |
| JP | 5449460 B2 | 3/2014 |
| JP | 2016062122 A | 4/2016 |
| JP | 2016-167299 A | 9/2016 |

\* cited by examiner

*Primary Examiner* — Vikkram Bali
(74) *Attorney, Agent, or Firm* — Canon U.S.A., Inc. IP Division

(57) ABSTRACT

An image processing method includes performing an object identification process on a plurality of image data, generating layout data on the basis of at least some of the plurality of image data subjected to the identification process and template data, controlling displaying of a layout image on a display on the basis of the layout data, acquiring setting information relating to a priority of a particular object, and extracting a replacement candidate image in response to a request for replacing an image in the displayed layout image. In extracting a replacement candidate image, the replacement candidate image is extracted on the basis of the setting information relating to a priority.

19 Claims, 26 Drawing Sheets

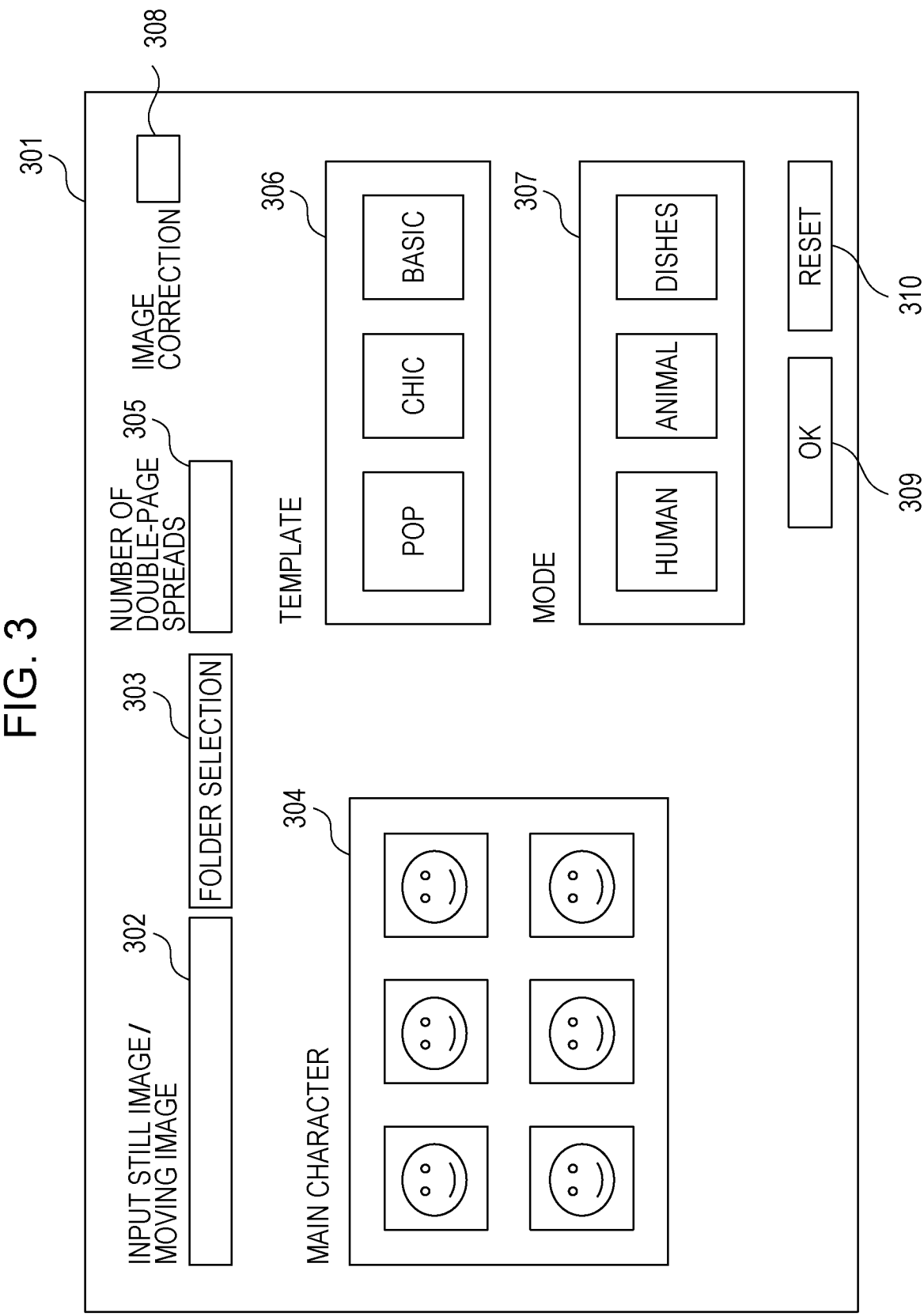

FIG. 5

| IMAGE ID | IMAGE CAPTURE DATE | IMAGE ATTRIBUTE | FOCUS | OBJECT CLASSIFICATION ||||||| NUMBER OF FACE IMAGES | PERSONAL ID |||||||||
|---|---|---|---|---|---|---|---|---|---|---|---|---|---|---|---|---|---|---|---|
| | | | | TOP1 || TOP2 || TOP3 || | 1 || 2 || 3 ||||
| | | | | CATEGORY | RELIABILITY | CATEGORY | RELIABILITY | CATEGORY | RELIABILITY | | UPPER LEFT POSITION | LOWER RIGHT POSITION | UPPER LEFT POSITION | LOWER RIGHT POSITION | UPPER LEFT POSITION | LOWER RIGHT POSITION | ⋮ |
| 1 | 2015/7/1 10h11m12s | STILL IMAGE | A | HUMAN | 90 | - | - | - | - | 6 | 40,40 | 65,65 | 90,40 | 115,65 | 10,20 | 25,35 | ⋮ |
| 2 | 2015/7/1 10h12m30s | MOVING IMAGE | A | HUMAN | 80 | ANIMAL | 40 | - | - | 2 | 50,100 | 100,150 | 150,125 | 190,165 | 150,125 | 190,165 | ⋮ |
| 3 | 2015/7/1 10h15m54s | SNS | A | ANIMAL | 70 | HUMAN | 10 | DISHES | 5 | 0 | - | - | - | - | - | - | ⋮ |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

501 502 503 504 505 506 507

| SCENE | RANGE OF CAPTURE DATE AND TIME (HOUR) | | NUMBER OF CAPTURED IMAGES | | NUMBER OF PERSONS PER IMAGE | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| EVERYDAY LIFE | 3.336 | 4.671 | 54.892 | 108.805 | 1.465 | 0.974 |
| CEREMONY | 4.634 | 1.532 | 165.457 | 71.055 | 2.547 | 0.527 |

| SCENE | IMAGE FEATURE OF MAIN SLOT | IMAGE FEATURE OF SUBSLOT |
|---|---|---|
| TRAVEL | ZOOM-OUT IMAGE INCLUDING PERSON AND LANDSCAPE | ZOOM-IN IMAGE OR PORTRAIT IMAGE |
| EVERYDAY LIFE | ZOOM-IN IMAGE OR PORTRAIT IMAGE | ZOOM-OUT IMAGE INCLUDING PERSON AND LANDSCAPE |
| CEREMONY | IMAGE INCLUDING TWO PERSONS BEING CLOSE TO EACH OTHER | IMAGE INCLUDING LARGE NUMBER OF PERSONS |

DATE AND TIME

FIG. 20

| MODE (MAJOR OBJECT) | CANDIDATE IMAGE 1 | CANDIDATE IMAGE 2 | CANDIDATE IMAGE 3 | CANDIDATE IMAGE 4 |
|---|---|---|---|---|
| HUMAN | HUMAN | HUMAN | THING | THING |
| ANIMAL | HUMAN AND ANIMAL | ANIMAL | HUMAN | THING |

FIG. 21

| MAJOR OBJECT | | CANDIDATE IMAGE 1 | | CANDIDATE IMAGE 2 | | CANDIDATE IMAGE 3 | | CANDIDATE IMAGE 4 | |
|---|---|---|---|---|---|---|---|---|---|
| HUMAN | ANIMAL | HUMAN | ANIMAL | HUMAN | ANIMAL | HUMAN | ANIMAL | HUMAN | ANIMAL |
| LESS THAN NORMAL | LESS THAN NORMAL | NO | NO | NO | NO | NO | NO | NO | NO |
| LESS THAN NORMAL | NORMAL | NO | YES | NO | YES | NO | NO | NO | NO |
| LESS THAN NORMAL | MORE THAN NORMAL | NO | YES | NO | YES | NO | YES | NO | YES |
| NORMAL | LESS THAN NORMAL | YES | NO | YES | NO | NO | NO | NO | NO |
| NORMAL | NORMAL | YES | YES | YES | NO | NO | YES | NO | NO |
| NORMAL | MORE THAN NORMAL | YES | YES | YES | YES | NO | YES | NO | NO |
| MORE THAN NORMAL | LESS THAN NORMAL | YES | NO | YES | NO | YES | NO | NO | NO |
| MORE THAN NORMAL | NORMAL | YES | YES | YES | NO | YES | NO | NO | NO |
| MORE THAN NORMAL | MORE THAN NORMAL | YES | YES | YES | YES | YES | YES | NO | NO |

IMAGE PROCESSING METHOD, IMAGE PROCESSING APPARATUS, AND NON-TRANSITORY COMPUTER-READABLE STORAGE MEDIUM

BACKGROUND OF THE INVENTION

Field of the Invention

The present disclosure relates to an image processing method, an image processing apparatus, and a non-transitory computer-readable recording medium and, in more particular, to an image processing method, an image processing apparatus, and a non-transitory computer-readable recording medium for performing processing, such as editing, on image data.

Description of the Related Art

A technique for laying out image data, such as photos, in slots of a template to create a photo album (photo book) has been developed. When images are automatically allocated to the slots, user's favorite images may not be allocated. In such a case, it is desirable that the user is allowed to replace the image with a new one. In Japanese Patent No. 5449460, a plurality of images are divided into groups based on the image capture time and the image capture location, and the groups are associated with the pages of the photo album. When replacing the image allocated to a slot, the replacement candidate images are selected from a group associated with the page and are displayed.

As described above, according to Japanese Patent No. 5449460, a plurality of images are divided into groups based on the image capture time and the image capture location. Accordingly, to replace an image in a particular slot, images having a close image capture time or a close image capture location are extracted as replacement candidate images. However, the object appearing in the image is not taken into consideration and, thus, there is a possibility that replacement candidate images that are user's desired images are not always displayed first.

SUMMARY OF THE INVENTION

The present disclosure provides a technique for extracting replacement candidate images that reflect user's preference by taking into consideration an object in the image.

According to an aspect of the present disclosure, an image processing method includes performing an object identification process on a plurality of image data, generating layout data on the basis of at least some of the plurality of image data subjected to the identification process and template data, controlling displaying of a layout image on a display on the basis of the layout data, acquiring setting information relating to a priority of a particular object, and extracting a replacement candidate image in response to a request for replacing an image in the displayed layout image. In extracting a replacement candidate image, the replacement candidate image is extracted on the basis of the setting information relating to a priority.

Further features of the present disclosure will become apparent from the following description of exemplary embodiments with reference to the attached drawings.

BRIEF DESCRIPTION OF THE DRAWINGS

FIG. 3 is a schematic illustration of a display screen displayed by the application according to the present disclosure.

FIG. 5 is a table denoting image analysis information according to the present disclosure.

FIG. 20 is a table denoting an example of selection conditions of a replacement candidate image according to the present disclosure.

FIG. 21 is a table denoting an example of a selection condition for a replacement candidate image according to the present disclosure.

DESCRIPTION OF THE EMBODIMENTS

Figure 1:
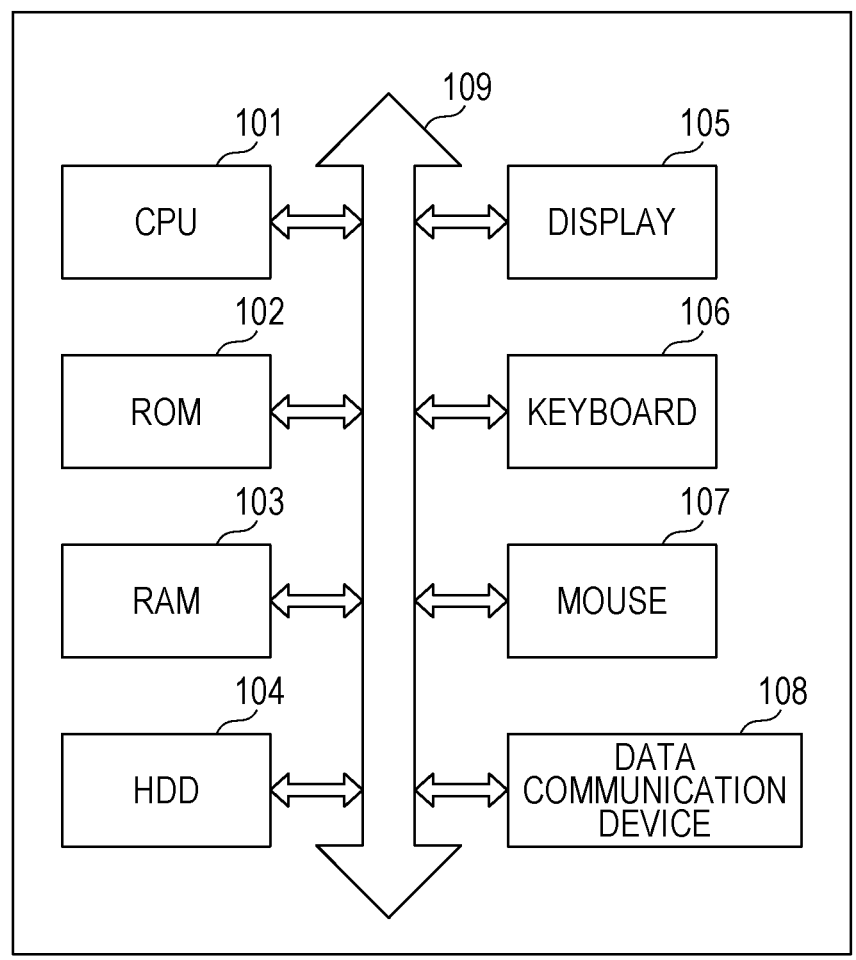
FIG. 1 is a block diagram of the hardware capable of executing an application according to the present disclosure.

Exemplary embodiments are described below with reference to the accompanying drawings. The following embodiments are in no way intended to limit the present disclosure, and not all combinations of features described in the present exemplary embodiment are essential to solving means of the present disclosure. The same reference numerals are used to designate the same constituent elements, and description of the constituent element is not repeated. In the following embodiments, the procedure in which an application program for photo album creation (hereinafter also referred to as an "album creation application") that runs on an information processing apparatus is started to automatically create a layout is described. As used herein, the term "image" refers to a still image, a moving image (video), or a frame image in a moving image captured by a user, or a still image, a moving image (video), a frame image in a moving image downloaded from Social Networking Service (SNS), unless expressly specified otherwise.

Hardware Configuration of Image Processing Apparatus

FIG. 1 is a block diagram of the hardware configuration of an image processing apparatus according to an exemplary embodiment of the present disclosure. Examples of the image processing apparatus include a personal computer (PC) and a smartphone. According to the present exemplary embodiment, the image processing apparatus is a PC. As illustrated in FIG. 1, an image processing apparatus 100 includes a central processing unit (CPU) 101, a read only memory (ROM) 102, a random access memory (RAM) 103, a hard disk drive (HDD) 104, a display 105, a keyboard 106, a mouse 107, and a data communication device 108, which are connected to one another via a data bus 109.

The CPU 101 is a system control unit, which performs overall control of the image processing apparatus 100. In addition, the CPU 101 executes, in accordance with a computer program, an image processing method according to the present exemplary embodiment described below. Although a single CPU is illustrated in FIG. 1, the number of CPUs is not limited to one. A plurality of CPUs may be employed.

The ROM 102 stores the computer program executed by the CPU 101 and an operating system (OS). The RAM 103 provides a memory that temporarily stores various information when the CPU 101 executes the program. The HDD 104 is a storage medium for storing, for example, image files and a database that retains the result of processing, such as image analysis. According to the present exemplary embodiment, the HDD 104 stores an application program for album creation (described in more detail below).

The display 105 is a device that presents, to the user, a user interface (UI) and the result of image layout according to the present exemplary embodiment. The display 105 may have a touch sensor function. The keyboard 106 is one of the input devices and is used to, for example, input predetermined information to the UI displayed on the display 105. According to the present exemplary embodiment, the number of double-page spreads of the photo album (photo book) is input via the keyboard 106. The mouse 107 is one of the input devices and is used to, for example, click a button on the UI displayed on the display 105.

The data communication device 108 is a device for communicating with an external device, such as a printer or a server. For example, the automatic layout data is transmitted to a printer or a server (neither is illustrated) connected to a PC via the data communication device 108. In addition, the data communication device 108 receives still-image data and moving-image data on a server or SNS.

The data bus 109 connects the above-described units (102 to 108) to the CPU 101.

Functional Configuration of Image Processing Apparatus

Figure 2:
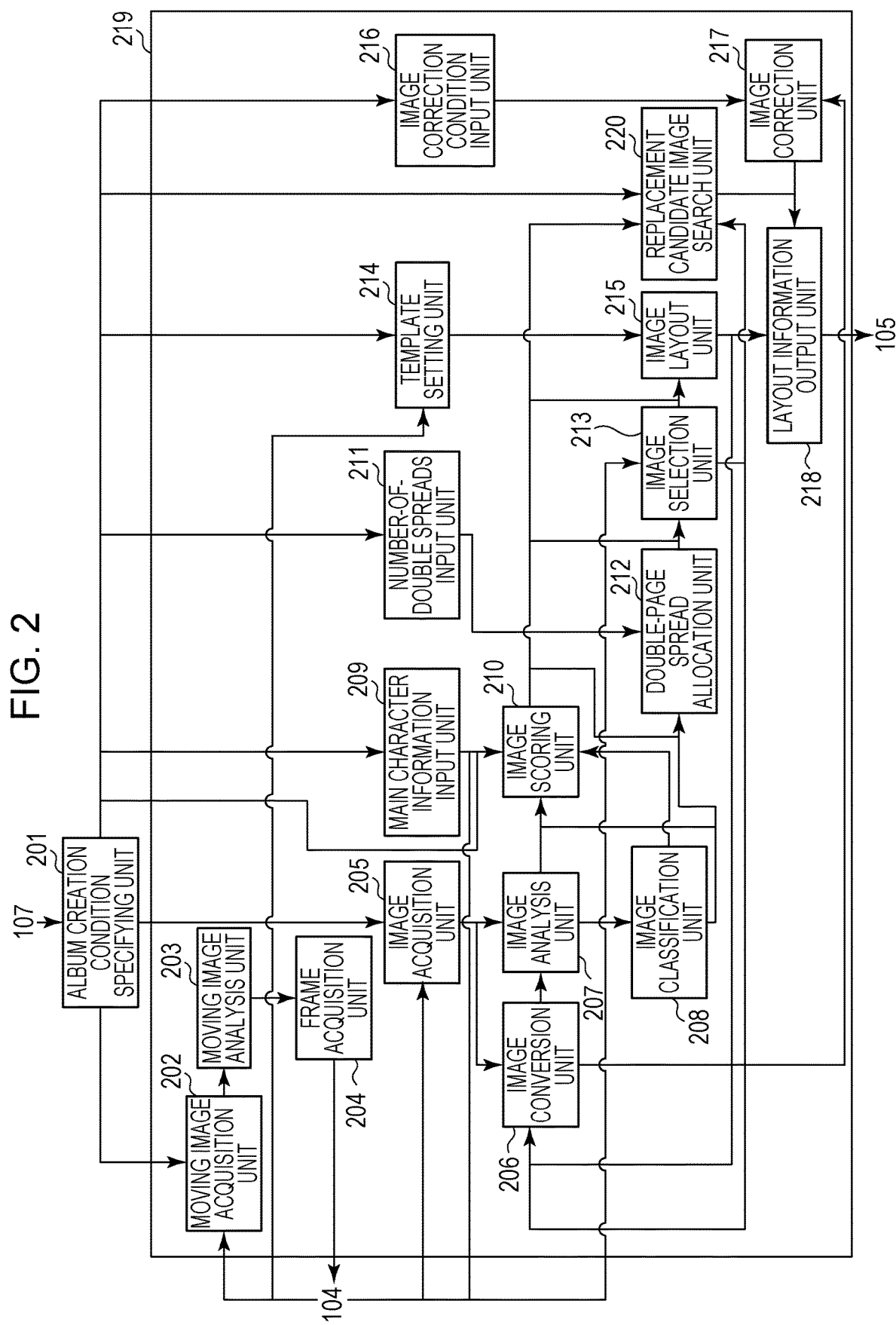
FIG. 2 is a software block diagram of the application according to the present disclosure.

The functional configuration of the image processing apparatus is described below. FIG. 2 is a software block diagram of an album creation application according to the present exemplary embodiment. According to the present exemplary embodiment, the album creation application stored in the HDD 104 is activated when the user double-clicks the icon of the application displayed on the display 105 by using the mouse 107. The album creation application has a variety of functions. According to the present exemplary embodiment, in particular, an automatic layout function provided by the automatic layout processing unit 219 is described. As illustrated in FIG. 2, the application includes an album creation condition specifying unit 201 and an automatic layout processing unit 219. The automatic layout function is a function for classifying or selecting photos according to the content or the attributes of the photos, laying out the photos, and generating an album image to be displayed on the display 105.

The album creation condition specifying unit 201 specifies, for the automatic layout processing unit 219, album creation conditions in accordance with the operation performed on the UI by using the mouse 107. According to the present exemplary embodiment, the specified album creation conditions include a main character, the number of double-page spreads, the type of template, the album creation mode, and information as to whether an image correction is performed. In addition, an object priority condition indicating which one of objects appearing in the image is preferentially laid out can be specified. To specify a still image/a moving image, accompanying information or attribute information of individual image data, such as the capture date and time, may be used. Alternatively, the information based on the structure of the file system including the still image/moving image data, such as the device or the directory, may be used. Note that in a display process, a double-page spread corresponds to one display window. In a printing process, a double-page spread corresponds to a pair of pages that are adjacent to each other and that are printed on different sheets.

The moving image acquisition unit 202 acquires, from the HDD 104, a moving image group (a moving image data group) specified by the album creation condition specifying unit 201. As used herein, the term "moving image group" refers to a candidate moving image group to be used to clip an image therefrom which are laid out when an album is created. The acquired compressed moving image data is decompressed by using a video decoder integrated in the OS so that analysis of the image can be performed.

The moving image analysis unit 203 analyzes the moving image data acquired by the moving image acquisition unit 202. As the result of analysis of the moving image data, it is determined whether the amount of motion is large or small on the basis of the compression information of the acquired moving image. Alternatively, the frame of interest of the user may be identified on the basis of the camera work of the photographer (e.g., zooming and panning). Furthermore, object detection, such as human face detection, and camera blur/bokeh (defocus) analysis may be combined with the above-described analysis to score the image. Through the analysis process, the position at which a good shot is located in the moving image can be identified.

A frame acquisition unit 204 cuts out a frame from the moving image and stores the frame in the HDD 104 as image data on the basis of the analysis result from the moving image analysis unit 203. At this time, the frame acquisition unit 204 stores the amount of motion, the camera work, and the score detected by the moving image analysis unit 203 in association with the cut-out image data. Upon storing the image data, the frame acquisition unit 204 may determine the usage information of the image data, such as an "image used for the album" or a "candidate image used by the user for replacement after the album is created", on the basis of the score and store the usage information in association with the image data.

An image acquisition unit 205 acquires, from the HDD 104, the image group (the image data group) specified by the album creation condition specifying unit 201. The moving image acquisition unit 202 may acquire the image group from a storage area, such as a server or SNS on the network, via the data communication device 108. As used herein, the term "image group" refers to a group of candidate images to be used in creating an album. For example, in the album creation condition specifying unit 201, if the condition "January 1st XXXX to December 31st XXXX" is specified as the condition for the capture date and time of the images to be laid out, all of the image data captured between January 1st XXXX and December 31st XXXX are acquired as the image group.

Examples of an image stored in a storage area (e.g., the HDD 104) include a still image and a clipped image cut out from a moving image. Still images and clipped images are acquired from image pickup devices, such as digital cameras and smart devices. The image pickup device may be included in the image processing apparatus 100 or an external apparatus. When the image pickup device is included in an external device, the image is acquired via the data communication device 108. Still images and clipped images may be images acquired from a network or a server via the data communication device 108. An example of an image acquired from a network or a server is a social networking service image (hereinafter simply referred to as an "SNS image"). The program executed by the CPU 101 analyzes the data attached to the individual images and determines the file source. An SNS image may be acquired from SNS via an application so that the source of the SNS image may be managed by the application. The image is not limited to the above-described image. Another kind of image may be used.

An image conversion unit 206 converts number-of-pixels information and color information of the image data acquired by the image acquisition unit 205. Note that the number-of-pixels information and color information of the image data after conversion are predetermined by the image conversion unit 206, and the information is pre-stored in album creation application or a parameter file used by the album creation application. According to the present exemplary embodiment, the image data acquired by the image acquisition unit 205 is converted into image data having the number of pixels defined by 420 pixels on the short side and color information of sRGB.

An image analysis unit 207 analyzes the image data. According to the present exemplary embodiment, the image analysis unit 207 analyzes the image data that has been converted by the image conversion unit 206. More specifically, the feature amount is obtained from the converted image data. Thereafter, object detection in the converted image data, face detection, facial expression recognition of the detected face, and personal recognition using the detected face (an identification process) are performed. In addition, the image capture date and time information is acquired from the data (e.g., Exif information) attached to the unconverted image data acquired by the image acquisition unit 205. Instead of image capture date and time information acquired from the Exif information, the creation date and time or the modification date and time of the image data may be used. Alternatively, the information regarding the date and time at which the image data is uploaded to a server or SNS or downloaded from a server or SNS may be used. Hereinafter, such date and time information is also used as the image capture date and time information.

An image classification unit 208 performs a scene division process and a scene classification process (described below) on the image data group by using the image capture date and time information, the number of images, and the detected face information. The term "scene" refers to a scene of the captured image, such as "travel", "everyday life", "wedding ceremony". For example, a scene represents a collection of image data captured at photograph opportunity during a certain period of time.

A main character information input unit 209 inputs, to an image scoring unit 210, the ID (identification information) of the main character specified by the album creation condition specifying unit 201.

The image scoring unit 210 scores each of the image data such that the image data suitable for the layout has a high score. Scoring is performed in accordance with the information obtained by the image analysis unit 207 and the information obtained by the image classification unit 208. Note that other information may be used additionally or alternatively. According to the present exemplary embodiment, the image scoring unit 210 scores each of the image data such that the image data including the main character ID input from the main character information input unit 209 has a high score.

A number-of-double-page spreads input unit 211 inputs, to the double-page spread allocation unit 212, the number of double-page spreads in the album specified by the album creation condition specifying unit 201.

The double-page spread allocation unit 212 divides the image group (into sub-image groups) and allocates each of the sub-image groups to one of the double-page spreads. The double-page spread allocation unit 212 divides the image group according to the input number of double-page spreads and allocates each of the sub-image group to one of the double-page spreads. For example, when the number of double-page spreads is five, the double-page spread allocation unit 212 divides the acquired image group into five to form five sub-image groups and allocates each of the sub-image groups to one of the double-page spreads. While the present exemplary embodiment is described with reference to the image group divided according to the number of double-page spreads and each of the divided sub-image groups allocated to one of the double-page spreads, the image group may be divided according to the number of pages, and each of the divided sub-image groups may be allocated to one of the pages.

The image selection unit 213 selects image data from the sub-image group allocated to each of the double-page spreads by the double-page spread allocation unit 212 on the basis of the score given to the image data by the image scoring unit 210.

A template setting unit 214 reads, from the HDD 104, a plurality of templates corresponding to the template information (the template data) specified by the album creation condition specifying unit 201. Thereafter, the template setting unit 214 inputs the templates to an image layout unit 215. According to the present exemplary embodiment, the plurality of templates are held in the album creation application stored in the HDD 104. In addition, each of the plurality of templates includes, for example, information regarding the size of the entire template and information regarding the number of slots of the template, and the size and the position of each of the slots.

The image layout unit 215 determines the layout of the double-page spread. More specifically, a template suitable for the image data selected by the image selection unit 213 is selected from among the plurality of templates input from the template setting unit 214, and the layout position of each of the images is determined. In this manner, the layout of the double-page spread is determined.

A layout information output unit 218 performs display control to output layout information for displaying the layout image on the display 105 in accordance with the layout determined by the image layout unit 215. The layout image is, for example, an image including the images represented by the image data selected by the image selection unit 213 and arranged in the selected template. The layout information is bitmap data representing an image.

An image correction unit 217 performs a correction process, such as dodging correction (luminance correction), red eye correction, and contrast correction. An image correction condition input unit 216 inputs ON/OFF condition for the image correction specified by the album creation condition specifying unit 201 to the image correction unit 217. Turning on/off operation of the image correction may be specified for each type of corrections or may be specified for all types of corrections in one go. If the image correction condition is ON, the image correction unit 217 performs a correction process on the image data. However, if the image correction condition is OFF, the image correction unit 217 does not perform the correction process on the image data. Note that the image correction unit 217 performs the correction process on image data input from the image conversion unit 206 in accordance with ON/OFF setting of image correction. The number-of-pixels information of the image data input from the image conversion unit 206 to the image correction unit 217 can be changed in accordance with the size of the layout image determined by the image layout unit 215. According to the present exemplary embodiment, an image correction is performed on each of the image data after generating the layout image. However, the image correction is not limited thereto. Correction of each of the image data may be performed before laying out (arranging) the images in the template.

The image data output from the layout information output unit 218 is displayed on the display 105 in a format as illustrated in FIG. 3, for example.

When the laid out image is replaced, a replacement candidate image search unit 220 functions as an image replacement control unit that searches the image data group for candidate images one of which may replace the laid out image and that extracts the images that meet the search condition. More specifically, the replacement candidate image search unit 220 extracts the candidate images by referencing the object priority condition specified by the album creation condition specifying unit 201 and the results of processing performed by the image selection unit 213 and the image scoring unit 210. Upon receiving the result of extraction, the image layout unit 215 and the layout information output unit 218 generate layout data and perform control to replace one of the images in the layout image on the basis of the layout image (the layout result) displayed on the display, which is a display unit. The processing is described in more detail below with reference to FIG. 16 and the subsequent figures.

According to the present exemplary embodiment, after the album creation application is installed in the image processing apparatus 100, a start icon is displayed on the top screen (the desktop) of the OS (operating system) running on the image processing apparatus 100. If the user double-clicks the start icon on the desktop displayed on the display 105 with the mouse 107, the program of the album creation application stored in the HDD 104 is loaded into the RAM 103. The program of the RAM 103 is executed by the CPU 101, and the album creation application is activated.

Setting Screen at Album Creation

FIG. 3 illustrates an example of a UI configuration screen 301 provided by the activated album creation application. The UI configuration screen 301 is displayed on the display 105. The user sets album creation conditions (described in more detail below) via the UI configuration screen 301, so that the album creation condition specifying unit 201 acquires setting information specified by the user. The path box 302 in the UI configuration screen 301 indicates the location (the path) of the image/moving image group used for album creation in the HDD 104. When a folder selection button 303 is clicked by the user with the mouse 107, the folder including the image/moving image group to be used for album creation is displayed in a tree structure so that the user can select the folder. At this time, the folder path of the folder including the image/moving image group selected by the user is displayed in the path box 302.

A main character specifying icon 304 is a display item used by the user to specify the main character. Human face images are displayed in the form of icons. In the main character specifying icon 304, a plurality of icons having different face images thereon are displayed side by side. By clicking one of the icons with the mouse 107, the user can select the icon. In this manner, a person corresponding to the selected icon is set as the main character of the album to be created. Note that each of the face images is associated with a personal ID. In addition, the main character specifying icon 304 is used to identify a main character, which is a pivotal figure, from the image represented by the image data to be analyzed. For example, the face images are detected from images represented by the image data in advance and are registered in the face database in association with the personal IDs. The main character specifying icon 304 is, for example, an icon having thereon the face images of the persons selected by the user among the face images of persons registered in the face database or the face images of the persons determined by a method described below. Alternatively, the main character can be automatically set by the procedure illustrated in FIGS. 4A and 4B.

The number-of-double-page spreads box 305 receives, from the user, the setting of the number of double-page spreads of the album. The user inputs a number directly to the number-of-double-page spreads box 305 by using the keyboard 106. Alternatively, the user inputs a number to the number-of-double-page spreads box 305 by selecting the number from a list with the mouse 107.

A template specifying icon 306 is a display item used to display an illustration image for the theme (e.g., a pop style or a chic style) of each of the templates. The plurality of template icons are displayed side by side in the template specifying icon 306. The user can select one of the template icons by clicking the icon with the mouse 107. At this time, a template corresponding to the selected icon is set as a template to be used for album creation. According to the present exemplary embodiment, a template includes image arrangement frames (slots) for arranging the image data. The image data are embedded in the slots of the template. In this manner, a layout image is achieved.

A mode specifying unit 307 is a display item for setting of the mode of the album to be created. Note that the mode of the album is a mode for preferentially laying out an image including a predetermined object in a template. According to the present exemplary embodiment, three modes of "human (portrait)", "animals", and "dishes" are provided. For example, when the mode "human" is selected, images each including a person are preferentially placed in the template. Alternatively, for example, when the mode "animals" is selected, images each including an animal are preferentially placed in the template. Still alternatively, for example, when the mode "dishes" is selected, images each including dishes are preferentially placed in a template. In addition, a mode for preferentially placing, in a template, the image data representing an image including an object other than the above-mentioned three types of objects may be provided. Furthermore, multiple modes may be selected at the same time. In such a case, an image including at least one of a plurality of types of objects corresponding to the selected modes is preferentially placed in a template. By clicking any one of the icons corresponding to the plurality of modes with the mouse 107, the user can select the icon. Thus, the mode corresponding to the selected icon is set as the mode of the album to be created. While the present exemplary embodiment has been described with reference to the mode of an album selected by the user via the mode specifying unit 307, the mode may be automatically selected by, for example, the CPU 101. In this case, for example, by analyzing the image data group acquired by the image acquisition unit 205, the CPU 101 identifies the category of the objects most frequently found in the image data group. Thereafter, the CPU 101 selects a mode corresponding to the identified category.

It should be noted that the object may be an individual piece (an individual person in the case of human) or may be one of classification categories of living things (e.g., "human" or "animal"), as illustrated in FIG. 3. Alternatively, the object may be a group to which an individual belongs (e.g., "family" or "pet"). That is, the object may be not only an individual but also a category into which the individual is classified. The object in the mode specifying unit 307 can be defined in accordance with the identifiable level.

When a score is given to each of the images, an extra score is added to the score of an image including the main object specified by the mode specifying unit 307, since the priority of the main object is high at the time of laying out the images. In addition, it is desirable that the specified result by the mode specifying unit 307 is used in the extraction condition of the candidate image for replacement (described in more detail below with reference to FIGS. 17 to 20).

A check box 308 receives the ON/OFF setting of image correction from the user. If the check box 308 is checked, an image correction is turned ON. However, if the check box 308 is not checked, an image correction is turned OFF. Note that the UI configuration screen 301 is designed to turn on or off all of the correction processes in one go. However, the UI configuration screen 301 may be designed to turn on or off each of the correction processes. The OK button 309 is a button for receiving, from the user, information indicating that settings have been completed. When the OK button 309 is clicked by the user with the mouse 107, the album creation condition specifying unit 201 acquires the information set on the UI configuration screen 301. Thereafter, the album creation condition specifying unit 201 outputs the acquired setting information to the automatic layout processing unit 219. At this time, the path set in the path box 302 is sent to the image acquisition unit 205. In addition, the personal ID of the main character selected in the main character specifying icon 304 is sent to the main character information input unit 209. Furthermore, the number of double-page spreads input to the number-of-double-page spreads box 305 is sent to the number-of-double-page spreads input unit 211. Still furthermore, the template information selected by the template specifying icon 306 is sent to the template setting unit 214. The ON/OFF setting of image correction in the check box 308 is sent to the image correction condition input unit 216.

The reset button 310 is a button for resetting all of the pieces of setting information displayed in the UI configuration screen 301. Note that in addition to the setting information displayed on the UI configuration screen 301, other settings may be made. For example, the setting of moving images and the setting of the source of supply of the image/moving image may be made. In this case, a server name box, a server selection button, a moving image usage check box, a target time period box, for example, are included in the UI configuration screen 301.

The server name box indicates the name of a server or SNS including the image group used for album creation. In addition, the server selection button is used to display the name of a server or SNS including the image group used for album creation in a list format so that the user can select one of the server names or SNS names. At this time, the server name or the SNS name selected by the user is displayed in the server name box. If the user clicks an OK button 309 by using the mouse 107 with the server name or the SNS name displayed in the server name box, a login screen used by the user to log in the specified server or SNS is displayed. After the user completes logging in to the specified server or SNS through the user operation on the displayed login screen, the CPU 101 can acquire the image data from the specified server or SNS.

The moving image usage check box receives, from the user, the setting as to whether a moving image stored in the folder specified in the path box 302 or the server or SNS specified in the server name box is to be used for album creation. If the moving image usage check box is checked, a moving image stored in the server or SNS is used for album creation. However, if the moving image usage check box is not checked, a moving image stored in the server or SNS is not used for album creation.

The target time period box receives, from the user, the setting of the condition for the date and time range in which the images in the still image/moving image group to be used for album creation were captured. In addition, the target time period box displays the specified date and time range. If the OK button 309 is clicked with the mouse 107 with the date and time range displayed in the target time period box, the still image group/moving image group captured during the specified date and time range is selected and extracted for album creation.

Flow of Automatic Layout Process

Figure 4A:
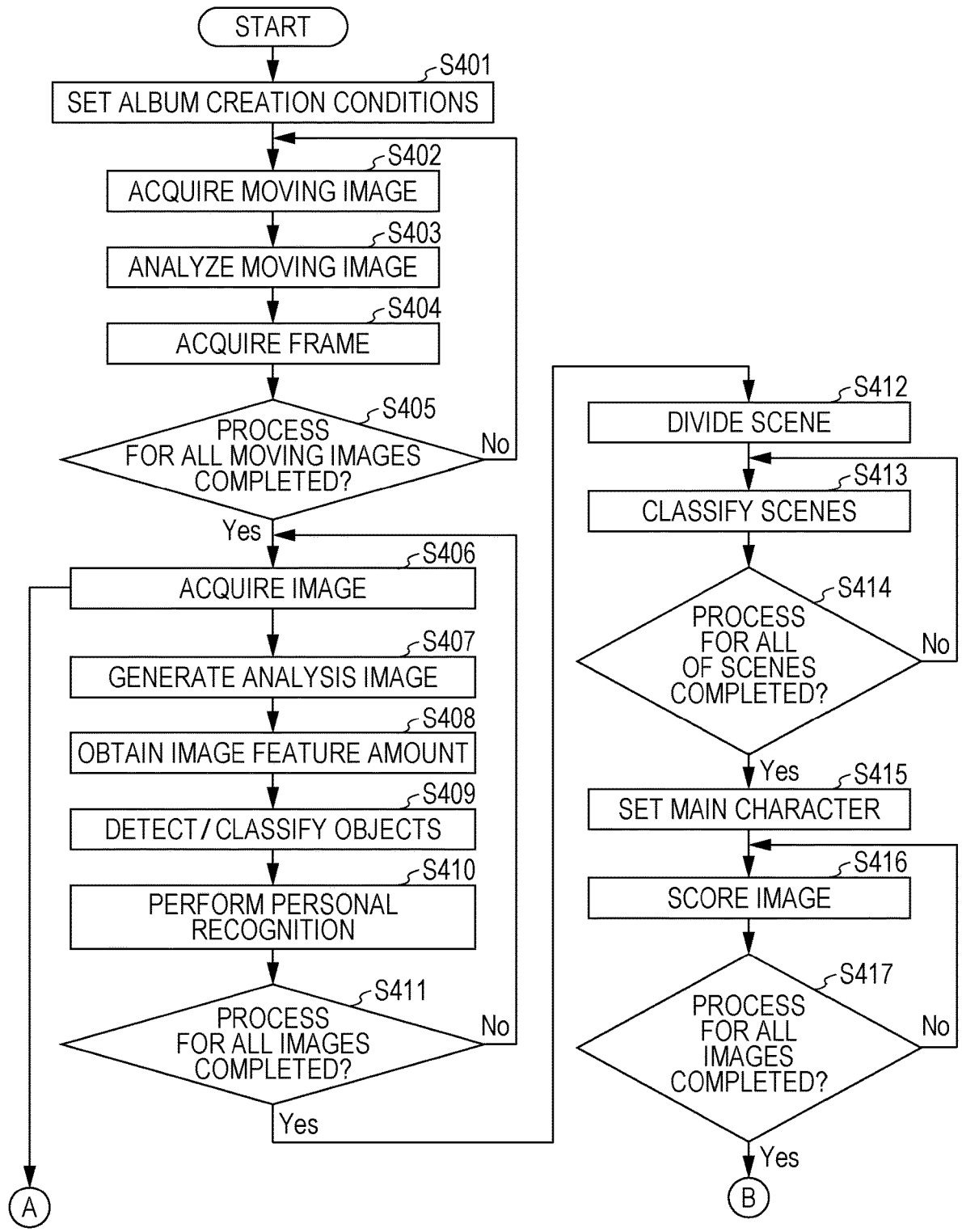
FIGS. 4A and 4B are process flow diagrams of an automatic layout process according to the present disclosure.
Figure 4B:
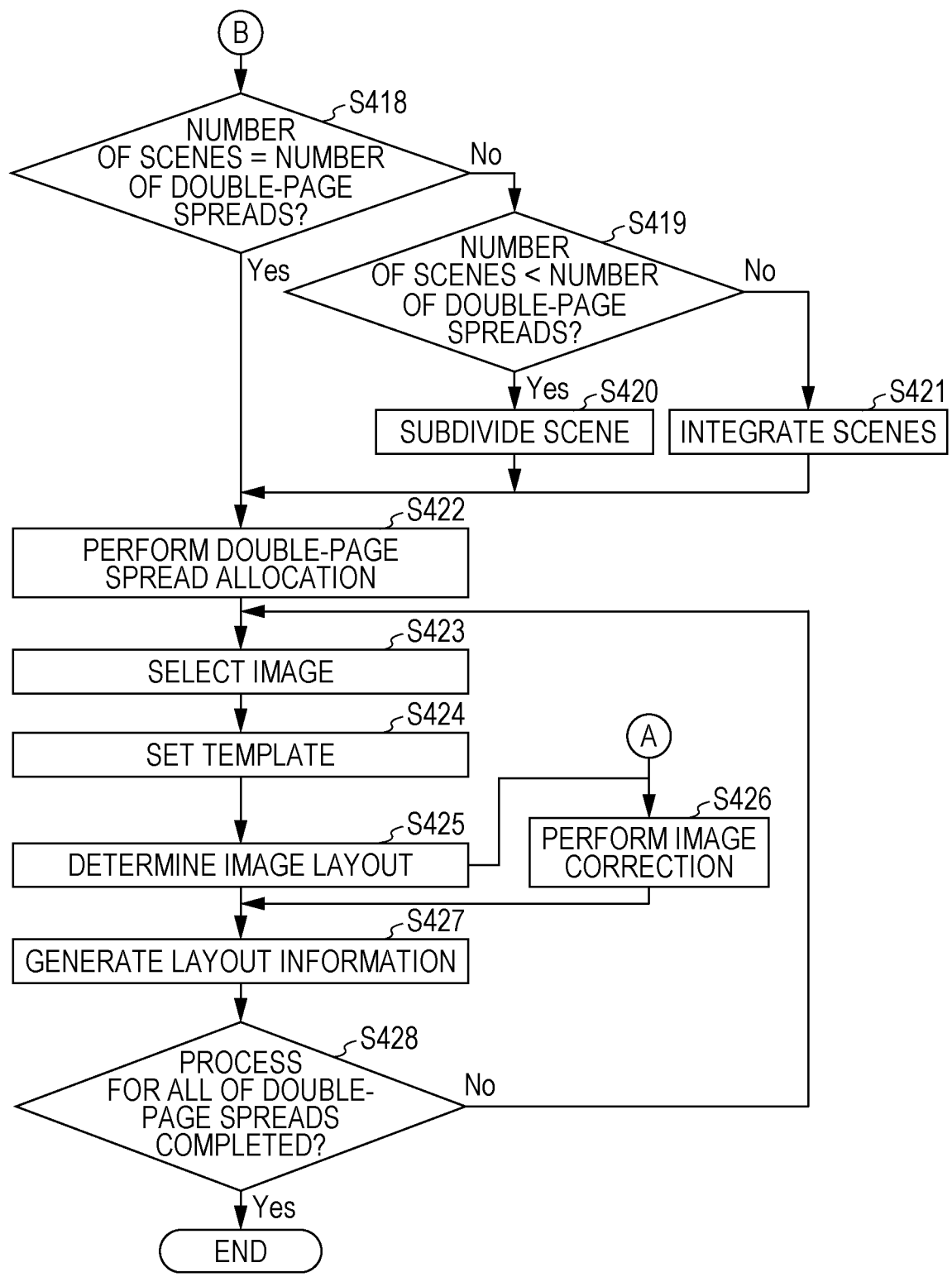

FIGS. 4A and 4B are flowcharts illustrating an automatic layout process performed by the album creation application according to the present exemplary embodiment. The process in the flowchart illustrated in FIGS. 4A and 4B is performed by, for example, the CPU 101 that loads a program corresponding to the album creation application stored in the HDD 104 onto the ROM 102 or the RAM 103 and executes the program. The automatic layout process is described below with reference to FIGS. 4A and 4B. As described below, according to the present exemplary embodiment, to create an album, the image group for album creation is divided into subgroups in accordance with the image capture date and time, and images to be arranged in a page are selected from each of the subgroups.

In step S401, the CPU 101 sets album creation conditions by using the album creation condition specifying unit 201. More specifically, for example, the CPU 101 receives the album creation conditions from the user via the screen illustrated in FIG. 3. The details of the setting of album creation conditions have already been described above with reference to FIG. 3.

In step S402, by using the moving image acquisition unit 202, the CPU 101 acquires the moving image data included in the storage area to be searched. The details of acquisition of moving image data have already been described above in the description of the moving image acquisition unit 202. Note that the storage area to be searched can be set by using, for example, the screen illustrated in FIG. 3 (e.g., the server name box). For example, the HDD 104, a server, or SNS is set as the storage area to be searched. The CPU 101 can determine the storage area to be searched in step S401.

In step S403, the CPU 101 analyzes the moving image data acquired in step S402 by using the moving image analysis unit 203. The details of analysis of the moving image data have already been described above in the description of the moving image acquisition unit 202.

In step S404, the CPU 101 cuts out a frame from the moving image data analyzed in step S403 and stores the cut-out frame in the HDD 104 in the form of image data by using the frame acquisition unit 204. Details of the process of cutting out a frame from the moving image data have already been described above in the description of the frame acquisition unit 204.

In step S405, the CPU 101 determines whether the processes in steps S402 to S404 have been completed for all of the moving image data included in the storage area to be searched. If the processes have not been completed for all of the moving image data (No in step S405), the processing returns to step S402, where unprocessed moving image data is acquired. However, if the processes have been completed for all of the moving image data (Yes in step S405), the processing proceeds to step S406.

In step S406, the CPU 101 acquires the image data included in the storage area to be searched by using the image acquisition unit 205. Note that like the setting of acquisition of moving image data, the storage area to be searched can be set by using, for example, the screen illustrated in FIG. 3 (e.g., the server name box). For example, the HDD 104, the server, or SNS is set as the storage area to be searched. The CPU 101 can determine the storage area to be searched in step S401. The image data acquired at this time include the image data acquired by cutting out a frame from the moving image data through the processes performed in steps S401 to S405. Note that if an image layout is produced manually, the processing may proceed from step S406 to step S426.

In step S407, the CPU 101 converts the image data by using the image conversion unit 206. Details of the conversion of the image data have already been described above in the description of the image conversion unit 206.

In step S408, the CPU 101 acquires the feature amount from the image data that has been converted by the image analysis unit 207 in step S407. An example of the feature amount is a focus. To detect an edge and obtain the feature amount of a focus, a widely used Sobel filter, for example, is employed. The gradient of edge, that is, the luminance gradient can be calculated by detecting the edge with a Sobel filter and dividing the luminance difference between the start point and the end point of the edge by the distance between the start point and the end point. From the calculation result of the average gradient of the edges in the image, it can be considered that the image with the large average gradient is in focus more than the image with the small average gradient. Thus, by setting a plurality of different threshold values for the gradient and determining which threshold value the average gradient of the image is greater than or equal to, an evaluation value of the focus measure can be output.

According to the present exemplary embodiment, two different threshold values are set in advance, and the focus measure is determined on three levels (A, B, and C). The threshold value is set in advance by experiments or the like so that an evaluation value of the focus gradient to be adopted for the album is "A", an evaluation value of the allowable focus gradient is "B", and an evaluation value of the unacceptable focus gradient is "C". The setting of the threshold values may be provided by, for example, the provider of the album creation application. Alternatively, the threshold values may be allowed to be set via the user interface.

In step S409, the CPU 101 performs an object detection process on the image data converted in step S407 by the image analysis unit 207. The CPU 101 detects the face of a person from the image represented by the image data converted in step S407 first. To perform the face detection process, a widely used technique can be employed. For example, Adaboost which creates a strong classifier from a plurality of weak classifiers prepared is employed. According to the present exemplary embodiment, a face image of a person (an object) is detected by a strong classifier created by Adaboost. In addition to extracting a face image, the CPU 101 obtains the upper left coordinate values and the lower right coordinate values of the detected face image. By obtaining these two types of coordinate values, the CPU 101 can acquire the position and the size of the face image. Note that the CPU 101 can further obtain information regarding the reliability of the detected object by performing the face detection process using Adaboost. The reliability is described in more detail below. In addition to detecting a face in step S409, to detect an object, such as an animal (e.g., a dog or a cat), a flower, dishes, a building, or a figurine, the CPU 101 may generate a strong classifier through Adaboost. In this manner, the CPU 101 can further detect an object other than the face. According to the present exemplary embodiment, in step S409, the CPU 101 performs a process of detecting an animal and dishes in addition to a process of detecting a face.

In step S410, the CPU 101 performs individual recognition (an identification process) by using the image analysis unit 207. More specifically, the CPU 101 performs individual recognition by evaluating the similarity between the face image extracted in step S409 and the representative face image stored for each of the individual IDs in the face dictionary database. The CPU 101 determines the similarity between the face image extracted in step S409 and each of the representative face images and sets the ID of the face image extracted in step S409 to the ID of the representative face image having the highest similarity among the face images having similarities higher than or equal to the threshold value. That is, a person corresponding to the representative face image having the highest similarity among the face images having similarities higher than or equal to the threshold value is identified as a person corresponding to the face image extracted in step S409. Note that if the similarity between the face image extracted in step S409 and each of all of the representative face images stored in the face dictionary database is less than the threshold value, the CPU 101 assigns a new personal ID to the extracted face image and registers the face image and the personal ID in the face dictionary database as a new person. In addition to a person, the CPU 101 may identify an object such as an animal. In step S410, identification information is added to each of the images on the basis of the result of object identification. Note that as the identification information, category-based identification information, such as human, animal, and thing, may be added to each of the images in addition to individual-based identification information, such as a personal ID.

Image analysis information 500 of each of the image data acquired in steps S408 to S410 is associated with an image ID 501 for identifying the image data and is stored in a storage area, such as the RAM 103 or the HDD 104. For example, as illustrated in FIG. 5, image capture date and time information 502 and a focus evaluation result 504 acquired in step S408, the number of face images 506 detected in step S409, and position information 507 are stored in the form of a table. Note that the position information of the face image is stored for each of the individual IDs acquired in step S404. In addition, an image represented by one image data may include the face images of a plurality of persons. In this case, a plurality of personal IDs are associated with the image ID 501 of the image data representing an image including the face images of a plurality of persons. If an image includes no face image, no personal ID is associated with the image ID 501 of the image data representing an image including no face image. According to the present exemplary embodiment, only the number of human face images and the positions of the face images are managed. However, the number of other objects (e.g., the faces of animals or dishes) and the positions of the objects may be further managed.

Image attribute 503 represents the attribute of each of the image data. For example, the image data cut out from the moving image data and stored has an attribute of "moving image". In addition, for example, the image data acquired from an SNS server has an attribute of "SNS". As described above, the attribute may be information indicating whether the image data is acquired from a still image or acquired from a moving image or may be information regarding the storage area (e.g., an SNS server or an HDD) in which image data is stored. That is, according to the present exemplary embodiment, the attribute is information regarding the source of supply of the image data. Note that attributes may be categorized by a method other than the above-described method. Each of the attributes may be further categorized into subgroups, such as "still image captured by a digital camera" and "still image captured by a smart device". The attribute of each of the image data may be managed by a flag indicating whether the image data corresponds to each of the attributes.

Object classification 505 indicates the category (the type) of the object included in the image represented by each of the image data and the reliability of the category. Note that the CPU 101 can detect an object included in the image represented by each of the image data by using, for example, Adaboost. At this time, the CPU 101 further detects the category of the object included in the image represented by the image data and the reliability of the category. Adaboost cascades weak classifiers that classify patterns to form a single strong classifier. Therefore, the reliability of an object of a predetermined category in given image data increases when the album creation application performs a learning process by using Adaboost in advance and the image represented by the image data includes a large number of weak classifiers that match the pattern corresponding to the predetermined category. Note that in this example, an object is detected and the reliability is obtained by using Adaboost. However, an object may be detected and the reliability may be obtained by using ConvolutionalNeuralNetwork including DeepNeuralNetwork.

According to the present exemplary embodiment, objects of three categories "human", "animal", and "dishes" are detected, and the information regarding the category of the object detected in the image represented by each of the image data is stored in the object classification 505. That is, the object classification 505 is the information indicating which category the object included in the image represented by each of the image data belongs to. Note that the information may be managed by using, for example, flags.

The reliability of a category is information regarding the probability of the category being the category of the object included in the image represented by the image data. Accordingly, as the reliability of the category increases, the probability of the category being the category of the object included in the image represented by the image data increases. Note that the reliability may be, for example, a value indicating the size of each of the objects in the image represented by the image data. In this case, for example, the size of an object of the category with a high reliability is larger than the size of an object of the category with a low reliability. Category information corresponding to an object not included in the image represented by the image data is not stored in the object classification 505. In addition, the categories are stored in fields TOP1, TOP2, and TOP3 in the object classification 505 in descending order of the reliability of category. Note that if an image represented by the image data includes objects of four or more categories, fields, such as TOP4 and TOP 5, may be provided.

In step S411, the CPU 101 determines whether the processes in steps S407 to S410 has been completed for all of the image data included in the storage area to be searched. If the processes have not been completed for all of the image data (No in step S411), the processing returns to step S406, where unprocessed image data is acquired. If the processes have been completed for all of the image data (Yes in step S411), the processing proceeds to step S412.

Figure 6A:
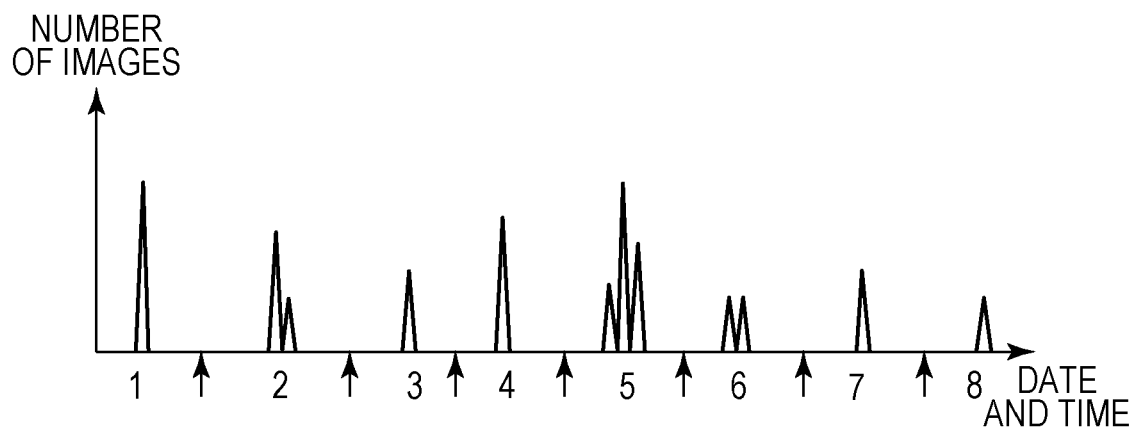
FIGS. 6A, 6B, and 6C illustrate image group division according to the present disclosure.
Figure 6B:
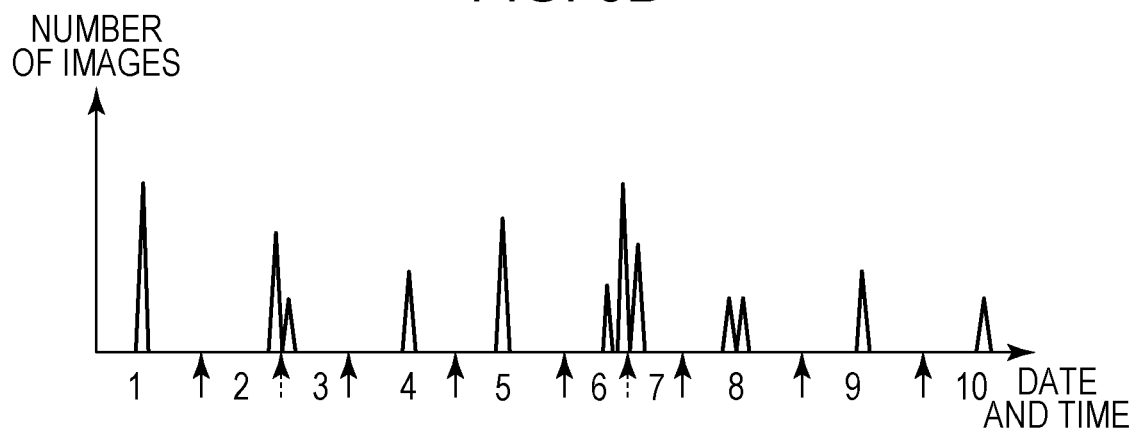
Figure 6C:
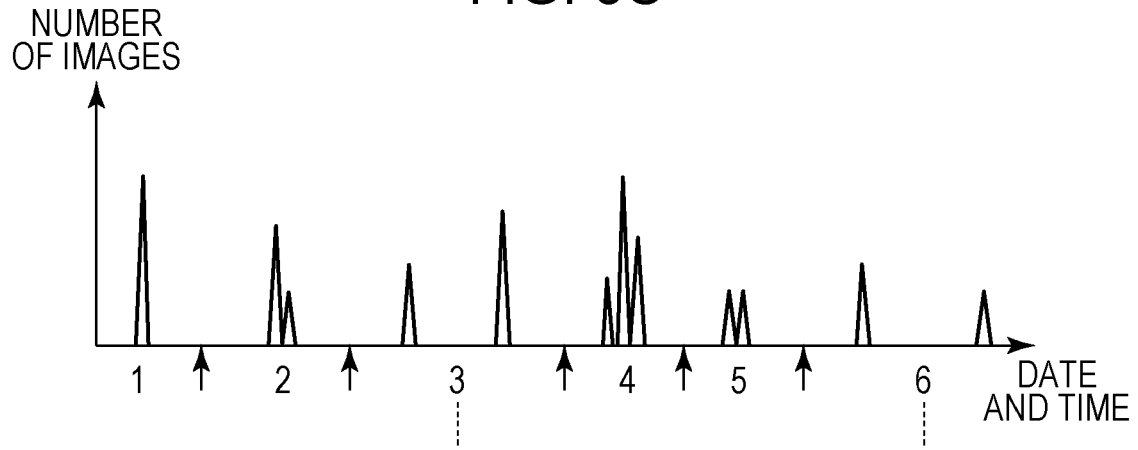

In step S412, the CPU 101 performs a scene dividing process by using the image classification unit 208. The scene dividing process is performed to divide all of the image data obtained in steps S401 to S411 into a plurality of image groups on the basis of scenes and manage the images as the plurality of image groups. More specifically, the CPU 101 divides all of the image data into a plurality of image groups on the basis of the time difference in image capture date and time between image data, which is calculated by using the image capture date and time information acquired in step S408. In the description below, each of the image groups obtained by dividing all of the image data (a main image group) is referred to as a "sub-image group". According to the present exemplary embodiment, the scene dividing process is performed by using, for example, a method described below. If the difference in image capture date and time between the Nth oldest captured image data and the (N+1)th oldest captured image data is less than or equal to one day, processing is further performed as described below. If the difference in image capture date and time between the Nth oldest captured image data and the (N+1)th oldest captured image data is greater than or equal to 16 hours, a group boundary is set between the Nth oldest captured image data and the (N+1)th oldest captured image data. In addition, in the case where the difference in image capture date and time between any two of temporally neighboring image data captured is less than 16 hours, if in an image data group of images captured in one day, the difference in image capture date and time between the image data captured first and the image data captured last is less than 4 hours, the image data group of images captured in one day is defined as a sub-image group (a group). However, if in an image data group of images captured in one day, the difference in image capture date and time between the image data captured first and the image data captured last is greater than or equal to 4 hours and if the number of image data captured in one day (i.e., the number of images captured in one day) is less than 50, the image data group of images captured in one day is defined as a sub-image group (a group). An example of such a method for grouping captured image data is illustrated in FIG. 6A. In FIGS. 6A to 6C, the abscissa represents the image capture date and time (with older images arranged toward the left and newer images arranged toward the right), and the ordinate represents the number of captured image data. In FIG. 6A, the captured image data group is divided into eight sub-image groups (groups 601 to 608). Arrows in FIG. 6A indicate group boundaries. Note that in the above-described scene dividing method, the threshold value for the time difference in image capture date and time and the threshold value for the number of captured image data are merely examples, and the threshold values are not limited to the above-described values. Note that the image groups generated by division are referred to as "divided image groups", and one divided image group is formed for each scene.

In step S413, the CPU 101 performs a scene classification process by using the image classification unit 208. More specifically, the CPU 101 scores each of the sub-image groups obtained by the scene dividing process in step S412 for each of the types of scenes. The sub-image group is classified as the type of scene having the highest score unless the reliability of scene classification (described below) is low. In the description below, the scoring in step S413 is referred to as "scene classification scoring". According to the present exemplary embodiment, the types of scenes are "travel", "everyday life", and "ceremony", and an example of classification of a sub-image group as one of these scenes is described. In scene classification scoring, a scene classification table is used. The scene classification table stores information about a feature amount corresponding to each of the types of scenes.

A method for creating a scene classification table pre-stored in a program is described below. A plurality of image data groups each classified as one of the scenes "travel", "everyday life" and "ceremony" in advance are collected by the designer of the program, and the feature amount is obtained for the collected image data groups first. Examples of the feature amount obtained at this time include the date and time range of the captured images, the number of captured images, and the number of persons in an image. The date and time range of the captured images represents the time difference between the image data captured first and the image data captured last in each of the image data groups. The number of captured images represents the number of captured images in each of the image data groups. The number of persons in an image represents the average number of faces included in each of the images in each of the image data groups. As a result, the feature amounts (i.e., the range of image capture dates and times, the number of captured images, and the number of persons in an image) are obtained for each of the image data groups composed of a plurality of image data and classified as, for example, a travel scene in advance. Note that the feature amounts are not limited to the range of image capture dates and times of the images, the number of captured images, and the number of persons in an image. Other feature amounts may be used. Alternatively, only one of the feature amounts may be used.

Thereafter, in the same manner, the feature amounts (the range of image capture dates and times of the images, the number of captured images, and the number of persons in an image) are obtained for the other image data groups collected in advance. Subsequently, the average value and the standard deviation of the ranges of image capture dates and times, the average value and the standard deviation of the number of captured images, and the average value and the standard deviation of the number of persons per image are obtained on the basis of the feature amounts obtained from the plurality of image data groups collected for each of the scenes. By associating the values obtained in this manner with the respective types of scenes, a scene classification table denoting the average value and the standard deviation for each of the types of scenes is generated.

Figure 7:
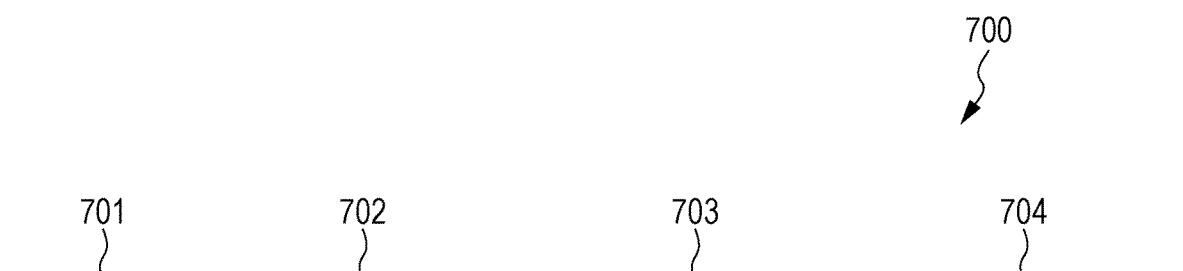
FIG. 7 is a table denoting scene classification according to the present disclosure.

According to the present exemplary embodiment, a table 700 illustrated in FIG. 7 is used as the scene classification table. In the table 700, the average value and the standard deviation of each of range of image capture dates and times 702, the number of captured images 703, and the number of persons per image 704 are registered in association with a scene ID 701. The CPU 101 stores the table 700 in the storage area, such as the ROM 102 or the HDD 104, before the scene classification process starts. Note that the table 700 may be incorporated into the program of the album creation application in advance or may be incorporated into a program other than the album creation application.

The scene classification scoring process is described below. After the album creation application is activated, the CPU 101 calculates the score for each of the sub-image groups formed through the scene dividing process performed on the image data group specified by the user by using the path box 302 or the server name box in step S412. Examples of the calculated score include the score of each of the feature amounts of the date and time range of the captured images, the number of captured images, and the number of persons in an image. The CPU 101 calculates the scores of the date and time range of the images, the number of captured images, and the number of persons in an image for each of the sub-image groups and calculates the average scores for each of the sub-image groups from the equations (1) and (2) using the average value and the standard deviation for each of the scenes illustrated in FIG. 7. Note that the average value of the predetermined feature amounts corresponding to the predetermined type of scene and the standard deviation of the predetermined feature amounts corresponding to the predetermined type of scene in the following equations are registered in the table 700. Furthermore, the feature amount is obtained for each of three feature items, namely, the date and time range of the images, the number of captured images, and the number of persons in an image. Accordingly, in this example, the number of feature items is 3.

The CPU 101 obtains the scores of the sub-image group for each of the types of scenes and for each of the feature amounts by using equation (1):

Score of a predetermined feature amount corresponding to a predetermined type of scene for a sub-image group=50−|10×(average value of predetermined feature amounts corresponding to the predetermined type of scene−predetermined feature amount of sub-image group)/standard deviation of the predetermined feature amount corresponding to the predetermined type of scene|    (1).

Thus, for example, in the sub-image group, the score of each of the date and time range of the images, the number of captured images, and the number of persons in an image corresponding to the scene "travel" is obtained. Note that in addition to the scores for the scene "travel", the CPU 101 obtains the scores for the other types of scenes.

Subsequently, to obtain the score of the sub-image group for each of the types of scenes, the CPU 101 averages the scores obtained by using equation (1) as follows:

Score of the sub-image group for a predetermined type of scene=(score of the range of image capture dates and times+score of the number of captured images+score of the number of persons in an image)/the number of feature items  (2).

In this manner, the scores of the sub-image group for, for example, the scenes of "travel", "everyday life", and "ceremony" are obtained. Note that the CPU 101 performs the scene classification scoring process on each of the sub-image groups.

Thus, the scores for "travel", "everyday life", and "ceremony" are calculated for each of the sub-image groups. Thereafter, the CPU 101 classifies the scene of the sub-image group as the scene having the highest score. For example, if a sub-image group 5 corresponding to a scene 5 after the scene division in FIG. 6A has a date and time range of the images of 36 hours, a number of captured images of 300, and a number of persons per image of 1.7, then the score of the sub-image group 5 for "travel" is 45.32, the score for "everyday life" is 18.38, and the score for "ceremony" is −29.92. Thus, the sub-image group 5 is classified as "travel" which is a scene having the highest score. Note that which sub-image group is classified as which scene is managed by using the scene ID so that identification is available. Also note that if the same scores of the scenes are obtained, the CPU 101 classifies the sub-image group as one of the scenes according to the predetermined priorities. More specifically, the CPU 101 classifies the sub-image group as the scene having the highest priority among the scenes having the same score. According to the present exemplary embodiment, the priority order is as follows: everyday life>ceremony> travel. However, the priority order is not limited thereto. The user, for example, may be allowed to set the priority order.

In step S414, the CPU 101 determines whether the scene classification process in step S413 has been completed for all of the sub-image groups acquired in step S412. If the scene classification process has not been completed for all of the sub-image groups (No in step S414), the processing returns to step S413, where the scene classification process is performed on an unprocessed sub-image group. If the scene classification process has been completed for all of the sub-image groups (Yes in step S414), the processing proceeds to step S415.

In step S415, the CPU 101 performs a main character setting process by using the image scoring unit 210. The main character setting process is performed on the image group specified by the user. The process is performed either automatically or manually. The CPU 101 can acquire the number of appearances of each of the personal IDs in the image data group, the number of appearances of each of the personal IDs in each of the scenes, and the number of scenes in which each of the personal ID appears on the basis of the result of the personal recognition process performed in step S410 and the result of the scene dividing process performed in step S412. When an automatic setting method is selected, the CPU 101 automatically sets a main character on the basis of the above-described information without using specification by the user. According to the present exemplary embodiment, when the image data group specified by the user is divided into a plurality of divided image data groups for each of the scenes, the CPU 101 sets the main character ID to the personal ID that appears frequently in a plurality of scenes. Furthermore, when the image data group is composed of a single scene, the CPU 101 sets the main character ID to a personal ID that appears frequently in the single scene. Alternatively, when the main character specifying icon 304 is specified by the user, the CPU 101 sends, to the image scoring unit 210, the personal ID specified via the main character information input unit 209. When the personal ID is specified by the user, the main character ID automatically set in the above-described manner is ignored, and the CPU 101 sets the main character ID to the personal ID specified by the user. This setting is referred to as "manual setting".

In step S416, the CPU 101 performs an image scoring process by using the image scoring unit 210. The image scoring process performed in step S416 is a process of giving a score (scoring) obtained by evaluating each of the image data from a viewpoint described below. The score is used when the image data representing an image to be placed in the template is selected (described in more detail below). According to the present exemplary embodiment, for the image data acquired by cutting out a frame from the moving image data, a score is given in further consideration of the result of analysis made by the moving image analysis unit 203. A scoring method is described below with reference to FIGS. 8A and 8B and FIGS. 10A and 10B.

Figure 10A:
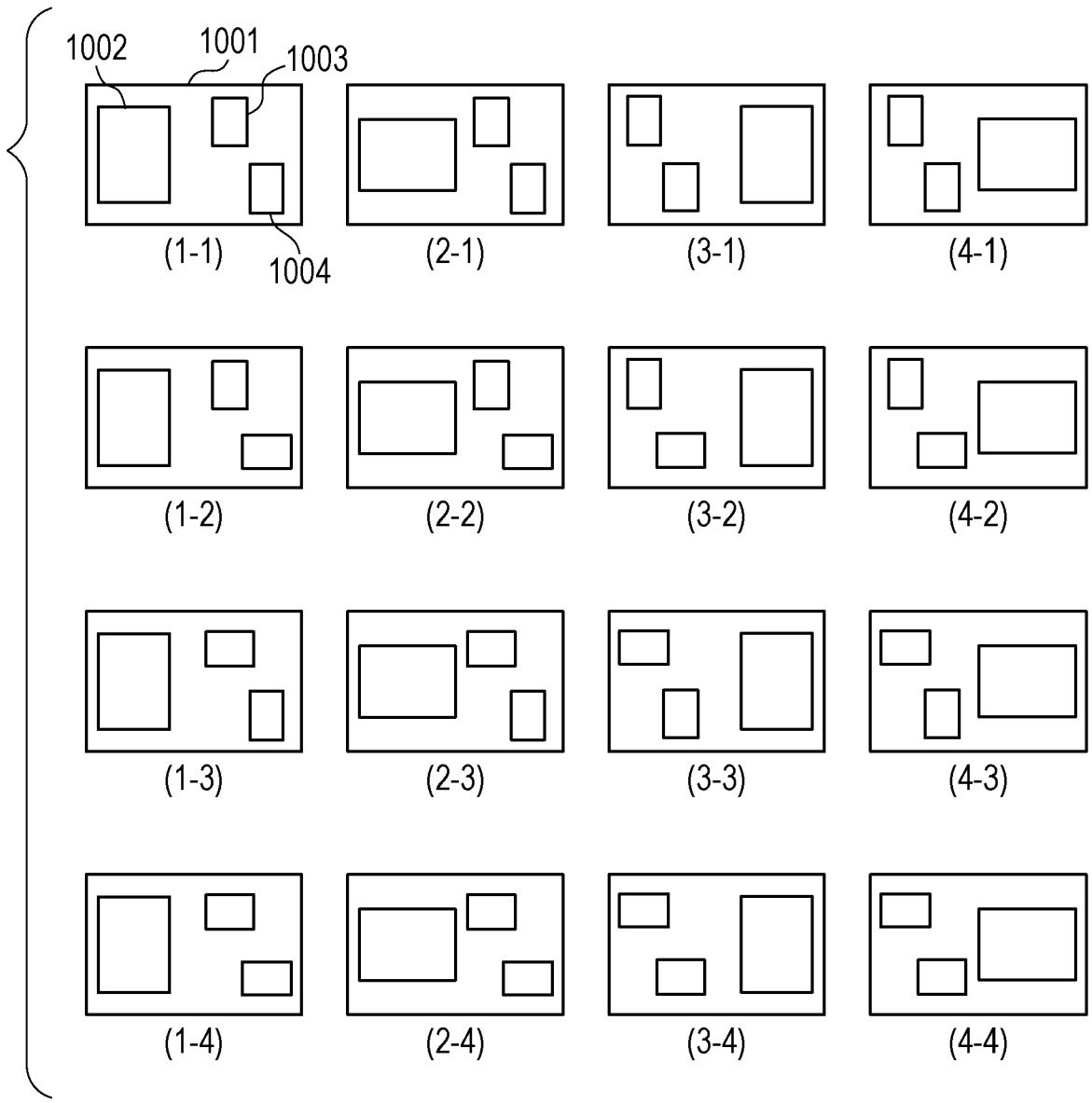
FIGS. 10A and 10B are schematic illustrations of an image layout process according to the present disclosure.

FIG. 10A illustrates a group of templates used to lay out image data. Each of the plurality of templates included in the template group corresponds to one of double-page spreads. A template 1001 includes a main slot 1002 and subslots 1003 and 1004. The main slot 1002 is the most noticeable slot (a frame in which an image is placed) of the template 1001. The main slot 1002 is larger in size than the subslots 1003 and 1004. Note that a template may have arranged therein images represented by the image data classified as the same type of scene or images represented by the image data classified as different types of scenes. In step S416, the CPU 101 performs a process of giving, to image data, both score for the main slot and score for the subslot corresponding to the scene of the type to which the image data belongs.

In the image scoring process, a slot feature table is used. The slot feature table stores information regarding the feature amounts of the images to be adopted in the main slot and sub-slots for each of the types of scenes.

Figures 8A, 8B:
FIGS. 8A and 8B are tables denoting the scores of images according to the present disclosure.

A method for generating the slot feature table is described below. FIG. 8A is a table in which the features of the image data adopted for the main slot and subslot are gathered for each of the scenes "travel", "everyday life", and "ceremony". Among the image data classified as each of the types of scenes, a plurality of image data classified to match the image feature to be adopted for the main slot are collected by the designer of the program. In addition, a plurality of image data classified to match the image feature to be adopted for the subslots are collected. That is, image data that match the feature illustrated in FIG. 8A is collected. Thereafter, the image analysis unit 207 extracts the feature amounts, such as the number of face images, the position of the face image, the size of the face image in each of the collected image data. Subsequently, the image analysis unit 207 calculates the average and the standard deviation of the extracted feature amounts for each of the types of scenes for each of the slot types (the main slot and the subslots). Thus, the slot feature table is generated. Note that the slot feature table is pre-stored in the storage area, such as the ROM 102 or the HDD 104, before the image scoring process is performed. The slot feature table may be incorporated into the program of the album creation application in advance or may be incorporated into a program other than the album creation application.

Note that as illustrated in FIG. 8A, the scoring criteria vary according to the type of slot. For example, when the scene type of a given sub-image group is "travel", the score of an image including a person and landscape among the images included in the sub-image group has a high score for the main slot, while the score of an image including a close-up face or a side face has a high score for a subslot. In addition, for example, when the scene type of a given sub-image group is "everyday life", the score of an image including a close-up face or a side face among the images included in the sub-image group has a high score for the main slot, while an image including a person and landscape has a high score for a subslot. Furthermore, for example, when the scene type of a given sub-image group is "ceremony", an image including two persons being close to each other among images included in the sub-image group has a high score for the main slot, while an image including a large number of persons has a high score for a subslot. As described above, the features to be evaluated, that is, the evaluation criteria vary according to the type of scene and the type of slot.

In the image scoring process, the CPU 101 scores an image data for each of the slots of the template corresponding to the scene of the type to which the image data belongs, as follows:

Score of image data for a predetermined feature
amount corresponding to a predetermined type
of slot=50−|10×(the average value of the feature amount corresponding to the predetermined scene to which image data belongs and the predetermined type of slot−the predetermined feature amount of the image data)/the standard deviation of the predetermined feature amount corresponding to the predetermined type of scene to which the image data belongs and the predetermined type of slot| (3).

Note that the type of scene to which the image data of the image data group specified by the user belongs can be identified from the result of the scene classification process performed in step S413. In addition, the average value of the predetermined feature amount corresponding to the predetermined type of scene and the predetermined type of slot and the standard deviation of the predetermined feature amount corresponding to the predetermined type of scene and the predetermined type of slot are registered in the slot feature table. Furthermore, the feature amount is obtained for three feature items, that is, the number of face images, the position of the face image, and the size of the face image of the main character ID. Therefore, the number of feature items is three in this example.

Thus, for example, the score of "the number of faces of the main character ID" corresponding to the main slot of the image data classified as the scene "travel" is acquired. In addition to the score of the feature amount corresponding to the main slot, the CPU 101 obtains score of the feature amount corresponding to the subslot. Furthermore, in addition to the score of "the number of faces of the main character ID", the CPU 101 obtains the scores of the feature amounts corresponding to "the position of the face image" and "the size of the face image".

Subsequently, the CPU 101 averages the scores obtained by equation (3) by using the following equation (4) to obtain the score of the image data for the predetermined slot:

Score of the image data for a given slot=(score of
the number of faces corresponding to the type
of scene to which the image data belongs and
the predetermined slot+score of the face position+score of the face size)/the number of feature items (4).

In this manner, scoring of the image data for both the main slot and the subslot is performed.

Furthermore, according to the present exemplary embodiment, the CPU 101 adds points to the score calculated as described above on the basis of the mode specified by the album creation condition specifying unit 201. More specifically, for example, the CPU 101 adds points in accordance with the mode specified by the mode specifying unit 307 and the result of object classification of each of the image data. For example, if the mode of the album is set to "human", the CPU 101 adds points if the category "human" is included in the object classification 505 illustrated in FIG. 5. However, the CPU 101 does not add points if the category "human" is not included in the object classification 505. Note that the points added at this time may be changed in accordance with the reliability of the category of "human" or the order of the reliability level. In a similar manner to the mode of "human", points are added in the modes of "animal" and "dishes". If multiple modes are specified, the CPU 101 adds points for each of the set modes. That is, when, for example, the album mode is set to "human" and "animal", the CPU 101 adds points if the object classification 505 includes the category of "human" and/or "animal". Note that if the object classification 505 includes categories of "human" and "animal", the CPU 101 adds both the points to be added when the category of "human" is included and the points to be added when a category of "animal" is included.

Note that the CPU 101 performs the image scoring process on each of the image data in the image data group specified by the user. The score given through the image scoring process is used as the selection criterion in the image selection process subsequently performed in step S423. As described above, even for the same image data, selection criteria differ depending on the classified scene. Since it is desirable that an image used for the album be in focus, predetermined points may be added to the score of the image having an image ID with the focus feature amount of "A" in the table illustrated in FIG. 5. In addition, since an image with a high number of pixels has little jaggy when being placed on an album, predetermined points may be added to the score of image data representing an image with a high number of pixels.

FIG. 8B illustrates an example of the scores resulted from a layout scoring process. A table 800 indicates the result of scoring each of the image data listed in an image ID field 801 for each of the main slot and the subslot. The score 802 is registered for each of the images registered in the image ID field 801. For example, in FIG. 8B, 20 points are given to the image with an image ID of 1 for the main slot, and 45 points are given to the image with an image ID of 2 for the main slot. That is, the table 800 suggests that the image with an image ID of 2 is closer to the determination criterion of the user for the main slot than the image with an image ID of 1.

In addition, according to the present exemplary embodiment, in the case where the score is given as described above, the CPU 101 adds points corresponding to the analysis result from the moving image analysis unit 203 to the score of the image data acquired by being cut out from moving image data for both the main slot and the subslot. Note that by referencing the image attribute 503 in the table illustrated in FIG. 5, the CPU 101 can identify which one of the image data subjected to the scoring process is the image data acquired by being cut out from the moving image data.

In addition, if points are simply added to the image data acquired by being cut out from the moving image data, it is highly likely that the score of the image data is uniformly higher than the score of image data acquired from still image data. Therefore, for example, the CPU 101 subtracts the average value of the points added to the image data acquired by being cut out from the moving image data from the score of each of the image data acquired by being cut out from the moving image data. Alternatively, the CPU 101 may add the average value to the scores of all of the image data acquired from the still image data. By adopting such a technique, points that are higher than the points added to the image data acquired from still image data are added to the image data having high added points among the image data acquired by being cut out from the moving image data. That is, the scoring process is performed such that among the image data acquired by being cut out from moving image data, image data with higher added points is more preferentially selected.

In step S417, the CPU 101 determines whether the image scoring process in step S416 has been performed on all of the image data acquired by the image acquisition unit 205. If the process has not been performed on all of the image data (No in step S417), the processing returns to step S416, where the image scoring process is performed on unprocessed image data. If the process has been performed on all of the image data (Yes in step S417), the processing proceeds to step S418.

According to the present exemplary embodiment, by using the image layout unit 215, the CPU 101 places the image represented by the image data included each of the scenes in each of the templates (each of the double-page spreads) to create a plurality of layout images. Therefore, the number of the scenes needs to be the same as the number of templates (the predetermined number of double-page spreads).

Accordingly, in step S418, the CPU 101 determines whether the number of scenes (the number of sub-image groups) obtained by the scene division in step S412 is the same as the number of double-page spreads input by the number-of-double-page spreads input unit 211 by using the double-page spread allocation unit 212. If the numbers are not the same (No in step S418), the processing proceeds to step S419. However, if the numbers are the same (Yes in step S418), the processing proceeds to step S422. For example, as illustrated in FIG. 6A, if the number of scenes is 8 and the number input to the number-of-double-page spreads input unit 211 is 8, the processing proceeds to step S422.

In step S419, by using the double-page spread allocation unit 212, the CPU 101 determines whether the number of scenes obtained through the scene division in step S412 is smaller than the number of double-page spreads input by the number-of-double-page spreads input unit 211. If the number of scenes is not less (is larger) than the input number of double-page spreads (No in step S419), the processing proceeds to step S421. However, if the number of scenes is less than the number of double-page spreads (Yes in step S419), the processing proceeds to step S420. For example, as illustrated in FIG. 6A, if the number of scenes is 8 and the number input to the number-of-double-page spreads input unit 211 is 10, the number of scenes is less than the number of double-page spreads. Accordingly, the processing proceeds to step S420.

In step S420, the CPU 101 performs a sub-scene dividing process by using the double-page spread allocation unit 212. In a sub-scene dividing process, each of the scenes generated through the scene dividing process is subdivided if the number of the divided scenes is less than the number of double-page spreads. The description below is based on the assumption that as illustrated in FIG. 6A, the number of divided scenes is 8 while the specified number of double-page spreads is 10. FIG. 6B illustrates the result of a sub-scene dividing process performed in FIG. 6A. In this example, the interval for division is more finely set, and division is performed at time points indicated by broken line arrows so that the division number is set to 10.

The criteria for division are described below. In the division illustrated in FIG. 6A, a divided range having a large number of image data is searched for. In this case, to increase the division number by 2 (from 8 to 10), two ranges each having a large number of image data are selected. That is, from among the scenes corresponding to the divided image data groups, the scenes to be subdivided are selected in decreasing order of the number of the image data included in the divided image data group. If there are scenes corresponding to divided image data groups having the same number of image data, a scene with the larger one of maximum difference in image capture date and time between the image data included in the corresponding divided image data group is selected. If the selection is still difficult, a scene corresponding to a divided image data group including the image data generated earlier may be preferentially subdivided, for example.

In FIG. 6A, the scene with the largest number of image data included in the corresponding divided image data group is scene 5, followed in order by scene 1 and scene 2. Scenes 1 and 2 have the same number of data. However, scene 2 has a larger time difference between the image data generated first and the image data generated last in the corresponding divided image data group. Accordingly, scene 2 is divided. That is, in FIG. 6A, each of scene 5 and scene 2 is divided.

Division of scene 2 is described first. Scene 2 has two peaks of the number of image data, and the capture date and time of the image data included in one of the two peaks differs from that of the image data in the other. Therefore, in FIG. 6B, the image data are divided at the time point indicated by the broken line arrow corresponding to a time point at which the image capture date and time changes. Division of scene 5 is described next. Scene 5 has three peaks of the number of image data. Like the scene 2, the image data included in these three peaks have different image capture dates and times. In scene 5, there are two time points at which the image capture date and time changes. In this case, the image data are divided on the image capture date and time basis so that the difference in the number of image data after division decreases. That is, in FIG. 6B, the image data are divided at the time point indicated by the broken line arrow.

In this manner, the division number, that is, the number of scenes is changed from 8 to 10. More specifically, in the scene subdividing process, if the selected scene includes image data having different image capture dates and times, the scene is divided so that each of the image data groups having different image capture dates and times forms a new scene. In addition, if the image capture date and time range is three days or longer, the scene is divided such that the difference in the number of image data included in a divided scene is minimized and the images having the same image capture date and time are included in the same scene. In the above description, the scene is divided at a time point at which the image capture date and time changes, as an example. However, if the capture dates and times of the image data in the scene to be divided are within a single day, the scene is divided at a time point at which the time difference in image capture time among the image data captured within a single day is maximized. Through the above-described procedure, the number of scenes is made the same as the number of double-page spreads. The scenes generated by division may be classified again, or the classification of scenes before division may be still applied.

In step S421, the CPU 101 performs a scene integration process by using the double-page spread allocation unit 212. In the scene integration process, the divided scenes (the sub-image groups) are integrated if the scene division number>the number of double-page spreads of the album. More specifically, the CPU 101 performs the scene integration process such that the number of scenes is the same as the number of double-page spreads. In this example, as illustrated in FIG. 6A, the scene division number is 8, while the specified number of double-page spreads is 6. FIG. 6C illustrates the result of integrating the scenes illustrated in FIG. 6A. By integrating the scenes before and after the time point indicated by each of broken lines, the number of divisions is set to 6.

The criteria of integration are described below. Among the divided scenes, the CPU 101 detects a scene with a small number of image data first. In this example, to reduce the number of scenes from 8 to 6, two scenes each having a small number of image data are detected. In FIG. 6A, the scene having the lowest number of the image data included in the corresponding divided image data group is scene 8, followed in order by scene 3 and scene 7. Note that scenes 3 and 7 have the same number of data.

Subsequently, the CPU 101 selects scene 8 having the lowest number of image data included in the corresponding divided image data group as the scene to be integrated. Thereafter, since scenes 3 and 7 have the same number of data included in the corresponding divided image data groups, the CPU 101 determines which one is to be integrated. In this example, since scene 8 adjacent to scene 7 is to be integrated (since scene 7 and scene 8 are integrated), scene 3 is selected as a scene to be integrated.

Subsequently, the CPU 101 determines whether the sub-image data group to be integrated is integrated with the scene in which the image capture date and time of the image data included in the corresponding divided image data group is earlier or the scene in which the image capture date and time of the image data included in the corresponding divided image data group is later than that of the sub-image data group to be integrated. In this case, of the two scenes adjacent to the scene to be integrated, the CPU 101 selects, as the target scene of integration, the scene having the shorter time difference in the image capture date and time between the image data included in the corresponding divided image data group. Accordingly, in FIG. 6A, one of scenes 2 and 4 is to be integrated with scene 3. Thus, the time difference in capture date and time of an image included in the corresponding divided image data group between scene 3 and scene 2, which is one of the scenes adjacent to scene 3, is compared with that between scene 3 and scene 4, which is the other scene adjacent to scene 3. In this case, the time difference between scene 3 and scene 4 is smaller than the time difference between scene 3 and scene 2. Consequently, the CPU 101 determines to integrate scene 3 with scene 4. That is, in FIG. 6C, the scenes are integrated at the time points indicated by the broken lines.

If, like scene 8, a scene has only one adjacent scene, the CPU 101 selects, as the target scene of integration, the only one adjacent scene.

In this way, in FIG. 6C, the scenes before and after the time point indicated by the broken line are integrated. Note that the scene integrating process further includes, for example, updating information regarding image files included in the scene in accordance with the integrated scene. According to the present exemplary embodiment, the sub-image groups having a small time difference in image capture date and time are integrated with each other. However, the sub-image groups to be integrated are not limited thereto. For example, the sub-image group to be integrated may be integrated with a sub-image group including a small number of captured images.

In step S422, the CPU 101 performs a double-page spread allocation process by using the double-page spread allocation unit 212. Through the processes performed in steps S418 to S421, the number of sub-image groups and the specified number of double-page spreads are made the same. According to the present exemplary embodiment, the sub-image group having the earliest image capture date and time is allocated first to the first double-page spread. That is, the sub-image groups are allocated to the double-page spreads of the album in ascending order of image capture date and time. In this manner, an album in which sub-image groups are arranged in ascending order of image capture date and time can be created. Note that in a double-page spread, the images need not be arranged in ascending order of image capture date and time (described in more detail below).

In step S423, the CPU 101 performs an image selection process by using the image selection unit 213. An example of the image selection process is described below with reference to FIGS. 9A to 9I. In this example, four image data are selected from a divided image data group allocated to a given double-page spread. Note that a double-page spread is an area for two pages. However, each of the first double-page spread and the last double-page spread is an area for one page.

Figure 9A:
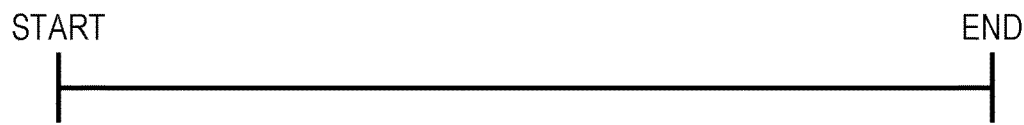
FIGS. 9A to 9I illustrate image selection according to the present disclosure.
Figure 9B:
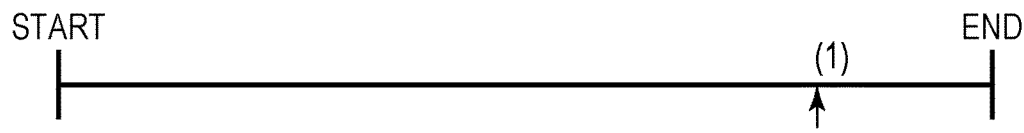

FIG. 9A illustrates the time difference between the earliest image capture date and time and the latest image capture date and time of the image data in the divided image data group allocated to a double-page spread (a divided date and time range). That is, FIG. 9A illustrates the date and time range of the divided image data group. In this example, image data are selected for a main slot first and, thereafter, for a subslot. In this example, a template corresponding to a double-page spread includes one main slot 1002. Accordingly, the image data selected as the first image is the image data for the main slot. Among the image data corresponding to the divided date and time range illustrated in FIG. 9B, the CPU 101 selects, as the image data for the main slot, image data (1) having the highest score for the main slot given in step S416.

Figure 9C:
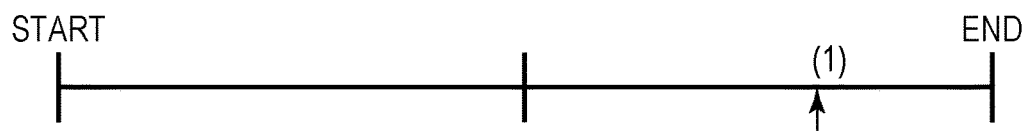
Figure 9D:
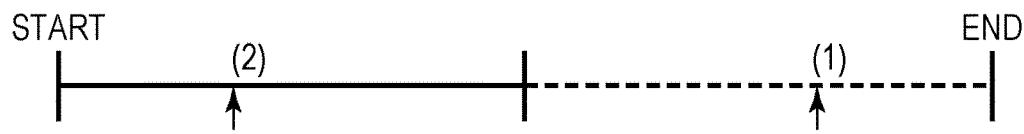
Figure 9E:
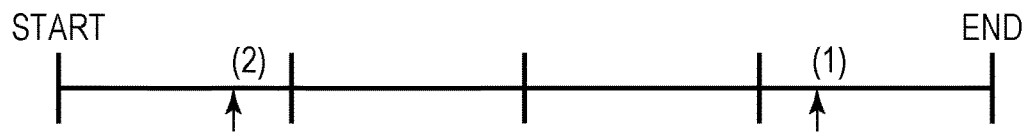
Figure 9F:
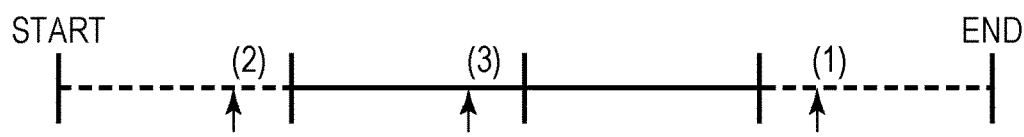

The image data selected as the second image and the subsequent images are image data for the subslots. The image data for the second image and the subsequent images are selected in the manner described below so that all of image data are not selected from only particular part of the divided date and time range. As illustrated in FIG. 9C, the CPU 101 divides the divided date and time range into two parts first. Subsequently, as illustrated in FIG. 9D, the CPU 101 selects image data for the second image from among the image data generated during one part of the divided date and time range from which the image data for the first image has not been selected (a part of the range shown as a solid line in FIG. 9D). Note that to select the image data for the second image, from among the image data generated during the part of the divided date and time range from which the image data for the first image has not been selected, image data (2) having the highest score for the subslot is selected. Subsequently, as illustrated in FIG. 9E, the CPU 101 divides each of the two parts of the divided date and time range into two parts. Thereafter, as illustrated in FIG. 9F, the CPU 101 selects the image data for the third image from among the image data generated during one of the two parts of the divided date and time range from which neither the image data for the first image nor the image data for the second image has been selected (a range shown as a solid line in FIG. 9F). Note that to select the image data for the third image, among the image data generated during the part of the divided date and time range from which neither the image data as the first image nor the image data as the second image has been selected, image data (3) having the highest score for the subslot is selected. Subsequently, to select the image data for the fourth image, from among the image data generated during the part of the divided date and time range from which none of the image data for the first image, the second image, and the third image has been selected, image data having the highest score for the subslot is selected.

Figure 9G:
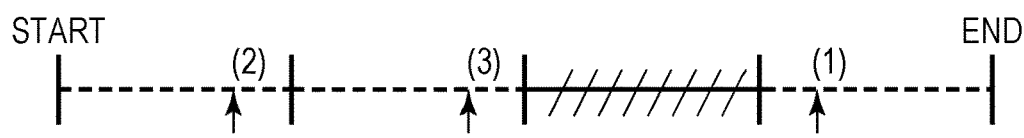
Figure 9H:
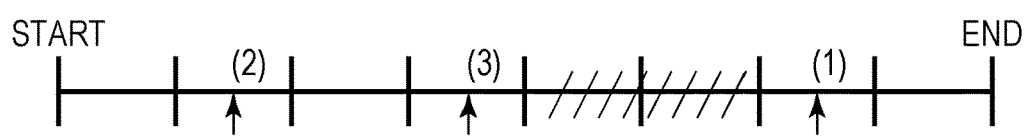
Figure 9I:
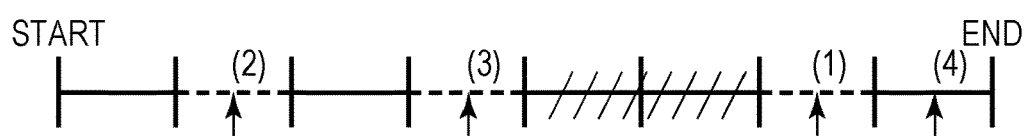

For example, assume that the following case occurs: No generated image data is found in the part of the divided date and time range in which none of the first, second, and third image data is selected and, thus, fourth image data cannot be selected from among the image data generated in the part of the divided date and time range. The processing in such a case is described below. As illustrated in FIG. 9G, assume that there is no image data generated during the part of the divided date and time range (the part indicated by slashes in FIG. 9G) in which any image data has not yet been selected. In this case, the CPU 101 further divides each of the parts of the divided date and time range into two parts, as illustrated in FIG. 9H. Subsequently, as illustrated in FIG. 9I, the CPU 101 selects the fourth image data from among image data generated in the part of the divided date and time range which is not the part determined to have no image data generated therein and in which any image data has not yet been selected (the part shown as a solid line). Note that from among the image data generated in the part of the divided date and time range, the CPU 101 selects, as the fourth image data, image data (4) having the highest score for the subslot.

Figure 11:
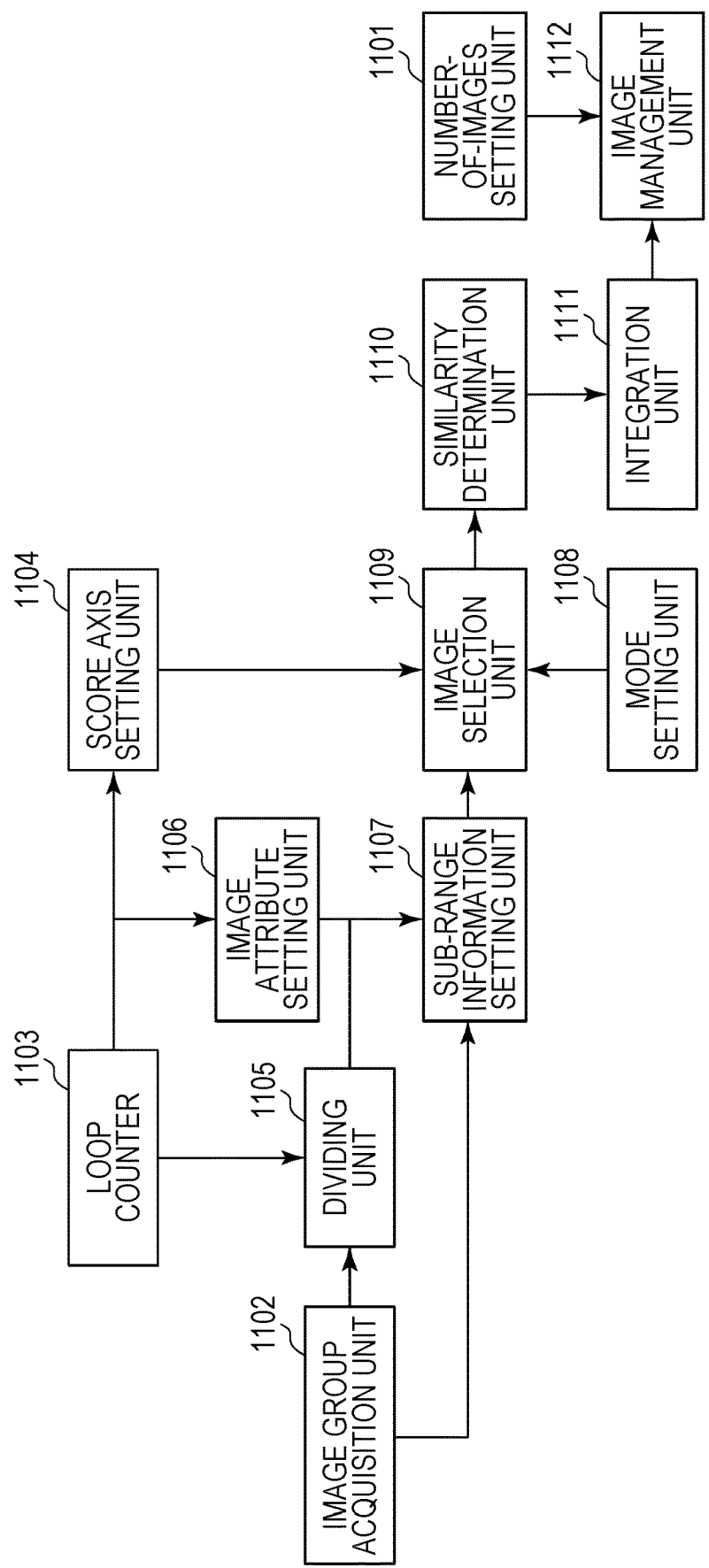
FIG. 11 is a block diagram illustrating an image selection unit according to the present disclosure.

FIG. 11 illustrates the configuration of the image selection unit 213 in more detail. The image selection unit 213 selects image data from the sub-image group allocated to the double-page spread to be processed.

A number-of-images setting unit 1101 sets the number of image data to be selected from the sub-image group allocated to the double-page spread to be processed. That is, the number-of-images setting unit 1101 sets the number of images to be arranged in the layout image of the double-page spread to be processed. Note that for example, the number of images set at this time may be input by the user via the setting screen illustrated in FIG. 3 or may be set for each of the double-page spreads in advance.

An image group acquisition unit 1102 acquires, from the image group acquired by the image acquisition unit 205, a sub-image group to be allocated to the double-page spread to be processed. In addition, the image group acquisition unit 1102 acquires the image capture date and time information, image type information, object classification information, the score for a main slot, and the score for a subslot of each of the image data. The image type information can be acquired by referencing the image attribute 503 illustrated in FIG. 5. In addition, the object classification information can be acquired by referencing the object classification 505 illustrated in FIG. 5.

A loop counter 1103 manages the number of iterations of the process of selecting image data from the sub-image group acquired by the image group acquisition unit 1102 (an image selection process). More specifically, the image selection process in which the loop counter 1103 counts the number of iterations is formed from the processes in steps S1205 to S1218, which are described in more detail below. The number of iterations managed is used to determine a score axis to be used and to set the division number used to subdivide the date and time range of the sub-image group allocated to the double-page spread. According to the present exemplary embodiment, since one image to be placed in the template is selected for each of the loops, the number of iterations the loop counter 1103 counts is the same as the number of selected image data.

A score axis setting unit 1104 sets the score axis used in the image selection process in accordance with the number of iterations of the process counted by the loop counter 1103. The term "setting the score axis to be used" refers to "setting which one of the scores based on different score axes is employed". In this case, one of a score axis for the main slot (the evaluation standard for the main slot) and a score axis for the subslot (the evaluation standard for the subslot) is set. Note that if the number of iterations of the process counted by the loop counter 1103 is 0, an image to be placed in the main slot (a main image) is selected. Thus, the score based on the main slot score axis is referenced. In contrast, if the number of iterations of the process counted by the loop counter 1103 is one or more, an image to be placed in the subslot (a sub-image) is selected. Thus, the score based on the subslot score axis is referenced. In the case where there are plurality of main slots, even if the number of iterations of the process counted by the loop counter 1103 is one or more, the score based on the main slot score axis may be referenced. Furthermore, the score axis setting unit 1104 may change the score axis to be set in accordance with, for example, the number of image data already selected (the selected image data). In this case, for example, if the number of selected image data is 0, the image to be placed in the main slot (the main image) is selected and, thus, the score based on the main slot score axis is referenced. In contrast, if the number of selected image data is one or more, the image to be placed in the subslot (the sub-image) is selected and, thus, the score based on the subslot score axis is referenced. Note that even in such a case, when there are plurality of main slots, the score based on the main slot score axis may be referenced even if the number of selected image data is one or more.

A dividing unit 1105 divides the date and time range of the sub-image group acquired by the image group acquisition unit 1102 into a predetermined number of sub-ranges. The dividing unit 1105 identifies, from the image capture date and time information of the sub-image group acquired by the image group acquisition unit 1102, the capture start date and time and the capture end date and time of the sub-image group allocated to the double-page spread to be processed and calculate the date and time range. That is, among the capture dates and times of the image data included in the sub-image group, the dividing unit 1105 identifies the earliest image capture date and time and the latest image capture date and time and calculates the date and time range. Subsequently, the dividing unit 1105 divides the calculated date and time range into a plurality of sub-ranges on the basis of the number of iterations of the process counted by the loop counter 1103. According to the present exemplary embodiment, let C be the number of iterations of the process counted by the loop counter 1103. Then, the dividing unit 1105 substantially equally divides the date and time range into $2^C$ sub-ranges. However, the dividing technique is not limited to the above-described technique. For example, the date and time range may be substantially equally divided into C sub-ranges.

An image attribute setting unit 1106 sets the attribute of the image data selected in the image selection process in accordance with the number of iterations of the process counted by the loop counter 1103. According to the present exemplary embodiment, to arrange a variety of image data in the album, the image data acquired from the still image data (the image data with an attribute of "still image") are more positively selected than the image data acquired from the moving image data (the image data with an attribute of "moving image"). The image data uploaded to the SNS server (the image data with an attribute of "SNS") are image data intentionally selected and uploaded by the user and, thus, are highly likely to be favorite image data of the user. Thus, according to the present exemplary embodiment, image data acquired from the SNS server are more positively selected than the image data acquired from the still image data. According to the present exemplary embodiment, if the number of iterations of the process counted by the loop counter 1103 is 0, the image attribute setting unit 1106 sets "SNS" as the specified attribute so that image data is selected from among the image data with an attribute of "SNS". In addition, if the number of iterations of the process counted by the loop counter 1103 is one, the image attribute setting unit 1106 sets "moving image" as the specified attribute so that image data is selected from among the image data with an attribute of "moving data". If the number of iterations of the process counted by the loop counter 1103 is two or more, the image attribute setting unit 1106 sets "still image" as the specified attribute so that image data is selected from among the image data with an attribute of "still image". By adopting such a technique, the attribute of the image data to be placed in each of the slots can be controlled. Note that the attribute of the image data selected in the image selection process may be set in accordance with, for example, the number of image data already selected in the image selection process. For example, in this case, if the number of the image data already selected in the image selection process is 0, the image attribute setting unit 1106 sets "SNS" as the specified attribute so that image data is selected from among the image data with an attribute of "SNS". If the number of the image data already selected in the image selection process is one, the image attribute setting unit 1106 sets "moving image" as the specified attribute so that image data is selected from among the image data with an attribute of "moving image". If the number of the image data already selected in the image selection process is two or more, the image attribute setting unit 1106 sets "still image" as the specified attribute so that image data is selected from among the image data with an attribute of "still image".

Note that the number of iterations of the process counted by the loop counter 1103 and the attribute corresponding to the number of selected image data are not limited to those described above. In the above description, the setting is made in order of "SNS", "moving image", and "still image". However, for example, the setting may be made in order of "moving image", "SNS", and "still image". Alternatively, setting may be made without specifying an attribute. In this case, "none" is set as the specified attribute so that image data of any one of attributes can be selected.

A sub-range information setting unit 1107 divides the image data included in the sub-image group acquired by the image group acquisition unit 1102 according to sub-ranges divided by the dividing unit 1105. Thereafter, the sub-range information setting unit 1107 acquires the information, such as image capture information and the score of the image data captured in each of the sub-ranges.

A mode setting unit 1108 sets the album mode (one of "human", "animal", and "dishes") specified by the album creation condition specifying unit 201. The mode setting unit 1108 performs control so that an image including an object corresponding to the set mode is placed in the template.

An image selection unit 1109 performs an image selection process on the basis of the score axis set by the score axis setting unit 1104, the mode set by the mode setting unit 1108, and the score of the image data in each of the sub-ranges managed by the sub-range information setting unit 1107. More specifically, the image selection unit 1109 selects, from among the image data which are included in each of the sub-ranges and which represents an image including the specified object and which has the specified attribute, one image data having the highest score. The specified object is set in order to select the image data without depending on only the score. If the specified object is set, the image data representing an image including the specified object is selected in the subsequent image selection processes. For example, if the specified object is an object of the category of "animal", image data representing an image including an object of the category of "animal" is selected in the subsequent image selection processes. Note that a plurality of objects can be set as specified objects.

Note that the score referenced at this time is a score obtained on the basis of the score axis set by the score axis setting unit 1104. As described above with reference to FIGS. 9A to 9I, no image data is selected from a sub-range having no image. While the present exemplary embodiment has been described with reference to selection of one image data having the highest score from among the image data representing images each including the specified object and having the specified attribute for each of the sub-ranges, the selection process is not limited thereto. For example, from among the image data each representing an image including the specified object and having the specified attribute, a plurality of image data having top scores may be selected from each of the sub-ranges. Note that the image selection unit 1109 considers the image data including the category corresponding to the specified object in any one of TOP1 to TOP3 fields of the object classification 505 as the image data representing the image including the specified object. Note that even if the category corresponding to the specified object is included in any one of TOP1 to TOP3 fields of the object classification 505, the image selection unit 1109 need not consider the image data as image data representing the image including the specified object.

A similarity determination unit 1110 determines whether the image represented by the image data selected by the image selection unit 1109 is similar to the image represented by the image data that has already been selected as the image data representing the image to be placed in the template. If the similarity is greater than or equal to a threshold value, the similarity determination unit 1110 determines that the images are similar to each other. However, if the similarity is less than the threshold value, the similarity determination unit 1110 determines that the images are not similar to each other. The image data determined not to be similar is retained. The image data determined to be similar is discarded. The similarity determination unit 1110 can obtain the similarity between the images represented by the image data by using a widely accepted method, such as pattern matching or the SHIFT method. For example, when the output similarity between images represented by image data is in the range of 0 to 100, the two are more similar as the similarity is closer to 100. Therefore, if the similarity between the images represented by the image data is greater than or equal to the threshold value for determination, it is determined that the two are similar. However, if the similarity between the images represented by the image data is less than the threshold value for determination, it is determined that the two are dissimilar. Note that the threshold value used for the similarity determination may be varied in accordance with the time difference in image capture date and time between the image data representing the images to be compared. For example, the threshold for determination may be set low (for example, 60) if the difference in capture date and time is short (for example, less than 15 seconds) due to continuous shooting or the like. Otherwise, the threshold value for determination may be set high (for example, 80).

An integration unit 1111 identifies the image data representing an image to be placed in the template from among the image data representing the images determined to be dissimilar by the similarity determination unit 1110. More specifically, the integration unit 1111 selects, from among the image data representing the images determined to be dissimilar by the similarity determination unit 1110, the image data having the highest score as the image data representing an image to be placed in the template. When only one image data determined to be dissimilar is found, the image data is selected. Note that the process is not limited to the above-described process. For example, image data may be selected from a sub-range that is not adjacent to the sub-range including the selected image data.

An image management unit 1112 manages, as a selected image data, the image data identified as the image data representing the image to be placed in the template by the integration unit 1111. In addition, the image management unit 1112 determines whether the number of selected image data has reached the number of images set by the number-of-images setting unit 1101 (the number of images required). The image selection process is repeated until the number of selected image data managed by the image management unit 1112 reaches the number of images required. At this time, control is performed so that the selected image data is not double-selected.

While the above-described description has been given with reference to the example in which the image data selected as the main image and the image data selected as the sub-image include the same object, the image data may include different objects. For example, when the loop count is 0, the main image is selected. Accordingly, the specified object used when the loop count is 0 may be changed when the loop count is not 0. By adopting such a technique, the image data selected as the main image and the image data selected as the sub-image include different objects.

Figure 12A:
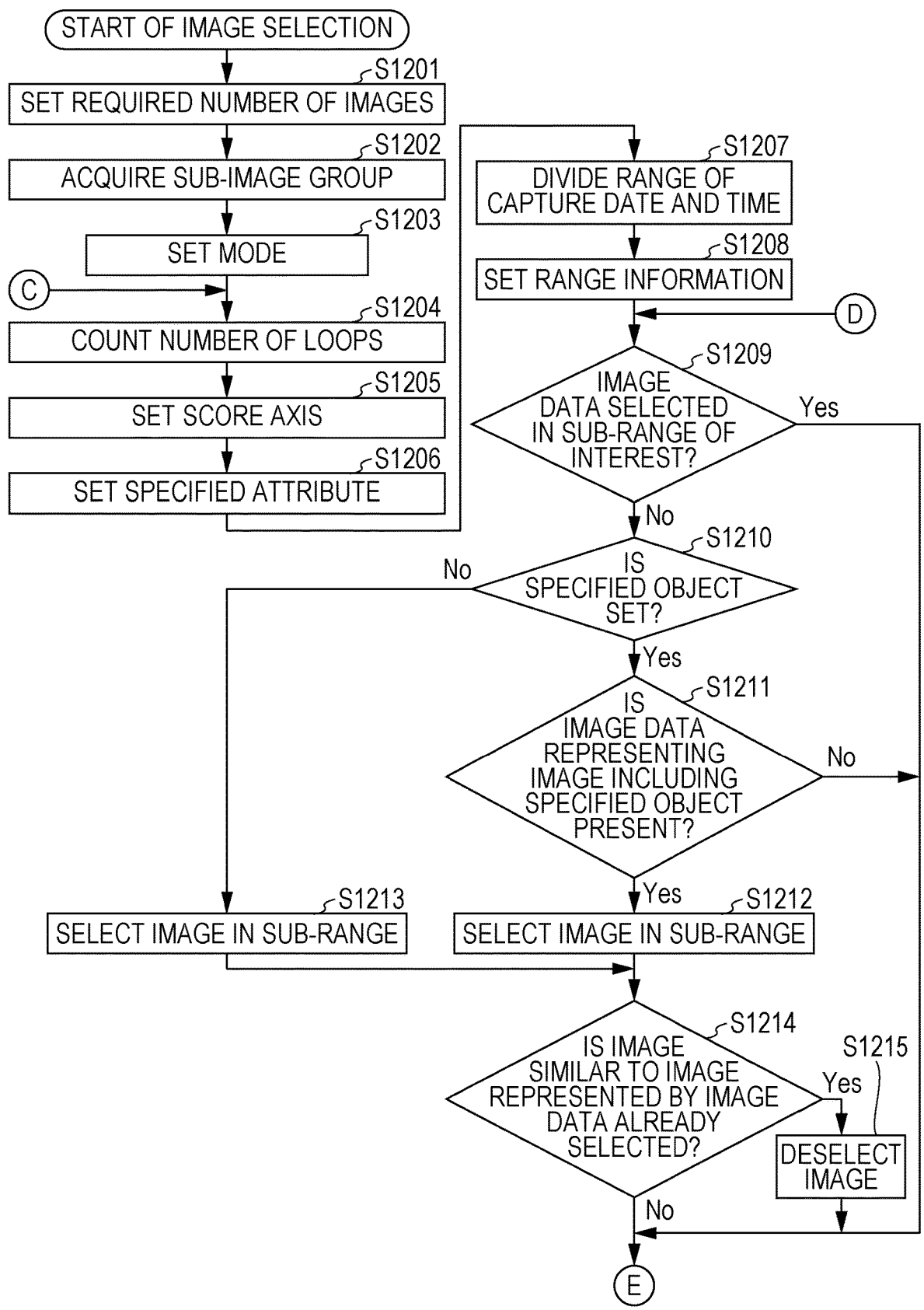
FIGS. 12A and 12B are detailed flowcharts of an image selecting step according to the present disclosure.
Figure 12B:
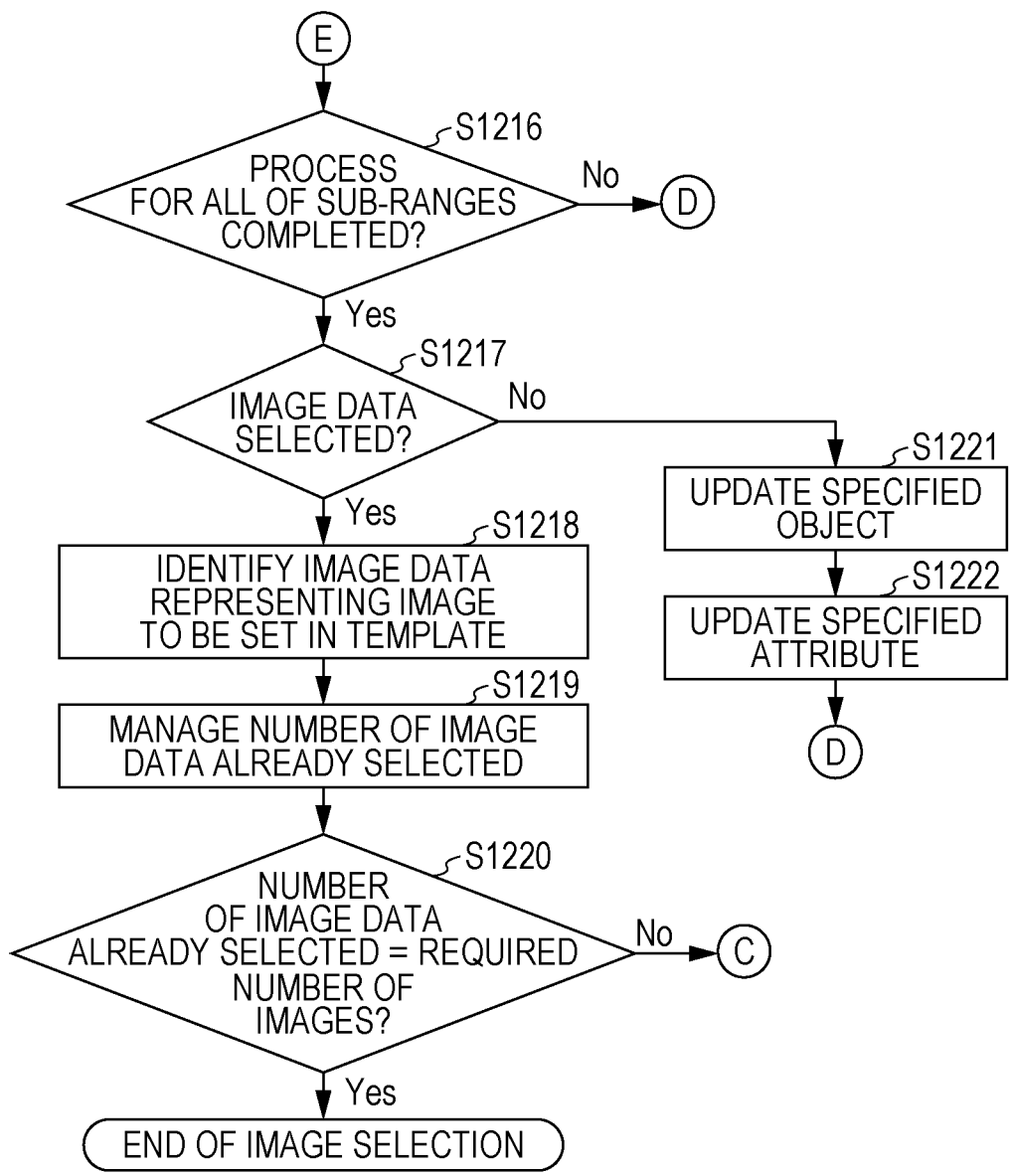

FIGS. 12A and 12B are flowcharts illustrating the details of the image selection process performed in step S423. The flowchart illustrated in FIGS. 12A and 12B is executed by, for example, the CPU 101 after loading a program corresponding to the album creation application stored in the HDD 104 onto the ROM 102 or the RAM 103. In the flowchart illustrated in FIGS. 12A and 12B, image data is selected from a sub-image group allocated to one of the double-page spreads to be processed. Accordingly, if the album is composed of a plurality of double-page spreads, the process illustrated in the flowchart of FIGS. 12A and 12B is performed a number of times equal to the number of the double-page spreads.

In step S1201, the CPU 101 sets the number of image data to be selected from the sub-image group allocated to the double-page spread to be processed by using the number-of-images setting unit 1101. The details of the process have already been given in the above description of the number-of-images setting unit 1101.

In step S1202, by using the image group acquisition unit 1102, the CPU 101 acquires, from the image group acquired by the image acquisition unit 205, the sub-image group to be allocated to the double-page spread to be processed. The details of this process have already been given in the above description of the image group acquisition unit 1102.

In step S1203, the CPU 101 sets the mode of the album by using the mode setting unit 1108. The details of this process have already been given in the above description of the mode setting unit 1108. When the process in step S1219 is performed, the CPU 101 switches the mode of the album to the mode selected in step S1219 and performs the subsequent processing.

In step S1204, by using the loop counter 1103, the CPU 101 counts the number of iterations of the image selection process performed in step S1205. Since in the initial state, the image selection process is not performed, the count number on the loop counter 1103 is 0. According to the present exemplary embodiment, if the count number on the loop counter 1103 is 0, a main image is selected in the subsequent image selection process. However, if the count number on the loop counter 1103 is one or more, a sub-image is selected in the subsequent image selection process.

In step S1205, the CPU 101 sets the score axis used in the subsequent image selection process by using the score axis setting unit 1104 in accordance with the count number counted by the loop counter 1103. The details of this process have already been given in the above description of the score axis setting unit 1104.

In step S1206, by using the image attribute setting unit 1106, the CPU 101 sets the attribute of the image data to be selected in the subsequent image selection process in accordance with the counted number counted by the loop counter 1103. The details of this process have already been given in the above description of the image attribute setting unit 1106.

In step S1207, by using the dividing unit 1105, the CPU 101 divides the date and time range of the sub-image group acquired by the image group acquisition unit 1102 into a predetermined number of sub-ranges. The details of this process have already been given in the above description of the dividing unit 1105.

In step S1208, by using the sub-range information setting unit 1107, the CPU 101 divides the image data included in the sub-image group acquired by the image group acquisition unit 1102 according to the sub-ranges obtained by dividing the date and time range of the sub-image group by the dividing unit 1105 and managed by the dividing unit 1105. Thereafter, the CPU 101 acquires the information regarding the image data captured in each of the sub-ranges (e.g., the image capture information and the scores).

In step S1209, the CPU 101 determines whether among the sub-ranges obtained by dividing the date and time range of the sub-image group and managed by the dividing unit 1105, the image data captured in the sub-range of interest has been selected. If the image data captured in the sub-range of interest has been selected, the processing proceeds to step S1216. However, if the image data captured in the sub-image of interest has not been selected, the processing proceeds to step S1210. Note that since in the first loop, the date and time range of the sub-image group is not divided, the sub-range of interest is the entire date and time range of the sub-image group.

In step S1210, the CPU 101 determines whether a specified object is set. For example, the specified object may be changed to "none" through a process of updating the specified object in step S1222. Accordingly, if the specified object is changed to "none" and, thus, a specified object is not set, the processing proceeds to step S1213. However, if the specified object is not changed to "none" and, thus, the specified object is set, the processing proceeds to step S1211.

In step S1211, the CPU 101 determines whether the image data representing an image including the specified object and having the specified attribute is present in the image data captured in the sub-range of interest. Note that the CPU 101 can make the determination in S1211 by referencing the image analysis information 500 of each of the image data captured in the sub-range of interest. More specifically, the CPU 101 determines whether each of the image data captured in the sub-range of interest represents an image including the specified object and has the specified attribute. If at least one image data captured in the sub-range of interest represents an image including the specified object and having the specified attribute, the determination result in step S1211 is "Yes" and, thus, the processing proceeds to step S1212. Note that the CPU 101 determines, as the image data representing an image including the specified object, the image data having the category of the specified object in the field of the image attribute 503 of the image analysis information 500.

If no image data represents an image including the specified object and having the specified attribute, the determination result in step S1211 is "No" and, thus, the processing proceeds to step S1216 without selecting any image data from among the image data captured during the sub-range of interest.

The category (the type) of the specified object may be changed in accordance with the number of iterations of the process counted by the loop counter 1103 or the number of selected image data. According to the present exemplary embodiment, when the number of iterations of the process counted by the loop counter 1103 is the initial value (0), the specified object is an object of a category corresponding to the mode set in step S1203 until the specified object is changed in step S1222.

In step S1212, the CPU 101 selects one of the image data captured in the sub-range of interest. The details of the process have already been given in the above description of the image selection unit 1109. In this case, one image data having the highest score is selected from among the image data representing images each including the specified object and having the specified attribute. Thus, according to the present exemplary embodiment, for example, image data representing an image including the specified object and having a low score is more positively selected than image data not including the specified object and having a high score. In addition, according to the present exemplary embodiment, for example, image data having a specified attribute but having a low score is more positively selected than image data having a high score but not having the specified attribute.

As described above, according to the present exemplary embodiment, instead of selecting the image data by simply referencing only the score, the image data is selected by referencing the specified object and the specified attribute. By adopting such a technique, if there is image data that meets the conditions in the sub-image group, the image data representing an image including the specified object (mainly, an object of a category corresponding to the set mode) can be more reliably selected. That is, the result of layout having placed therein the image including the specified object can be more reliably output. In addition, if there is image data that meets the conditions in the sub-image group, the image data having the specified attribute can be more reliably selected and, thus, the result of layout having placed therein an image represented by the image data having the specified attribute can be more reliably output.

Note that the CPU 101 can determine whether the image represented by each of the image data includes the specified object and can acquire the attribute and the score of the image data by referencing the image analysis information 500 of the image data. That is, if the image analysis information 500 includes the information indicating that the specified object is included, the CPU 101 can identify that the image represented by the image data includes the specified object. In other words, if the category information corresponding to the specified object is included in the object classification 505, the CPU 101 can identify that the image represented by the image data includes the specified object. In addition, if the image analysis information 500 includes the information indicating that the attribute is a specified attribute (that is, if the information regarding the specified attribute is included in the image attribute 503), the CPU 101 can identify that the image data has the specified attribute. Accordingly, in step S1212, the CPU 101 searches the image analysis information 500 of the image data captured during the sub-range and selects the image data having a category of the specified object in the field of the object classification field 505 and having the specified attribute in the field of the image attribute 503.

In step S1213, the CPU 101 selects one of the image data captured during the sub-range of interest. In this case, since the specified object is not set, the specified object is not referenced. Accordingly, from among only the image data having the specified attribute, the image data having the highest score is selected.

In step S1212 and S1213, if the image data that meets the conditions is not found, the processing proceeds to the next step without selecting any one of the image data.

In step S1214, by using the similarity determination unit 1110, the CPU 101 determines whether the image represented by the image data selected in the process in step S1212 or S1213 is similar to the image represented by the image data selected in step S1218 in the previous loop. The details of this process have already been given in the above description of the similarity determination unit 1110. If it is determined that the images are dissimilar, the processing proceeds to step S1216 with the selection made in step S1212 or S1213 being maintained. However, if it is determined that the images are similar, the selection made in step S1212 or S1213 is canceled, that is, the image data selected in the process in step S1212 or S1213 is not retained (step S1215), and the processing proceeds to step S1216. If none of the image data is selected, the process in step S1214 is skipped, and the processing proceeds to step S1216.

In step S1216, the CPU 101 determines whether the process in step S1212 or step S1213 has been performed for all of the sub-ranges of interest obtained by dividing the date and time range of the sub-image group and managed by the dividing unit 1105. If the image selection process has been performed for all of the sub-ranges of interest, the processing of the CPU 101 proceeds to step S1215. However, if the image selection process has not yet been performed for all of the sub-ranges of interest, the CPU 101 selects any one of the sub-ranges that have not been selected as a sub-range of interest and performs the processes in step S1209 and the subsequent steps again.

In step S1217, the CPU 101 determines whether the image selection process has been performed for all of the sub-ranges of interest and, thus, at least one of the image data has been selected. If at least one of the image data has been selected, the processing of the CPU 101 proceeds to step S1218. However, if no image data has been selected, the processing of the CPU 101 proceeds to step S1221.

In step S1221, the CPU 101 updates the specified object. Note that the content of the specified object after updating is not limited to a particular content. The content may be set as appropriate. For example, the specified object may be updated in accordance with a preset priority, or an object that is included in a plurality of images represented by the sub-image group allocated to the double-page spread to be processed may be updated as the specified object. Alternatively, the setting of the specified object may be set to "none". If updating is not needed (if the image selection process is performed by using the same specified object as in the previous loop), the process in step S1221 may be skipped.

In step S1222, the CPU 101 updates the specified attribute. Note that the specified attribute after updating may be set as appropriate. For example, the specified attribute may be updated in accordance with a preset priority, or an attribute that many images included in a sub-image group allocated to the double-page spread to be processed have may be set as the specified attribute by updating. Alternatively, the setting of the specified attribute may be "none". If updating is not needed (if the image selection process is performed by using the same specified attribute as in the previous loop), the process in step S1222 may be skipped. Thereafter, the processing proceeds to step S1209, where the image selection process is performed on the basis of the information updated in step S1221 or S1222.

In this way, if the process in at least one of S1221 and S1222 is performed, the conditions of the image data to be searched for are changed. Accordingly, the CPU 101 can newly select the image data. If the CPU 101 updates the information in step S1221 or S1222, the CPU 101 considers the sub-range already processed by using the previous information as the sub-ranges that have not been processed and, thus, performs the processes in step S1209 and the subsequent steps for the sub-ranges again.

According to the present exemplary embodiment, if, in step S1217, it is determined that no image data has been selected, the CPU 101 does not update the specified object and updates the specified attribute first. Subsequently, the CPU 101 performs the image selection process again. If no image data is selected even after the specified attribute is repeatedly updated, then the specified object is updated.

In step S1218, by using the integration unit 1111, the CPU 101 identifies, from among the image data determined to be dissimilar in step S1212 and being selected, image data representing an image to be placed in the template. The details of this process have already been given in the above description of the integration unit 1111.

In step S1219, by using the image management unit 1112, the CPU 101 manages the image data identified as the image data representing the image to be placed in the template in step S1218 as the selected image data. The details of this process have already been given in the above description of the image management unit 1112.

In step S1220, the CPU 101 determines whether the number of selected image data managed by the image management unit 1112 has reached the number of images set by the number-of-images setting unit 1101 (the required number of images). If the number of selected image data reaches the required number of images, the CPU 101 completes the image selection process, and the processing proceeds to step S424. However, if the number of selected image data has not reached the required number of images, the processing of the CPU 101 proceeds to step S1204 again, where the CPU 101 increments the value in the loop counter 1103 by one and performs the image selection process again. When the counter is incremented and the number of iterations of the process C is increased, the date and time range is divided into more sub-ranges than in the previous process. More specifically, according to the present exemplary embodiment, the date and time range of the sub-image group is divided into a plurality of sub-ranges equal in number to twice the previous division number. Since a greater number of sub-ranges are managed, image data which was not selected in the previous process can be selected in step S1211. In addition, according to the present exemplary embodiment, since image data is not selected from the sub-range including the already selected image data, it is a highly likely that the CPU 101 does not select the image data captured at the date and time close to the capture date and time and time of the selected image data. As a result, a diverse variety of image data are selected.

Referring back to FIGS. 4A and 4B, in step S424, by using the template setting unit 214, the CPU 101 acquires a plurality of templates in accordance with the template information specified by the album creation condition specifying unit 201.

In step S425, by using the image layout unit 215, the CPU 101 determines the image layout for the double-page spread to be processed. At this time, the CPU 101 selects, from among the plurality of templates acquired in step S424, a template suitable for the image data selected in step S423 first. A method for determining a template is described below with reference to FIGS. 13 and 14.

Figure 13:
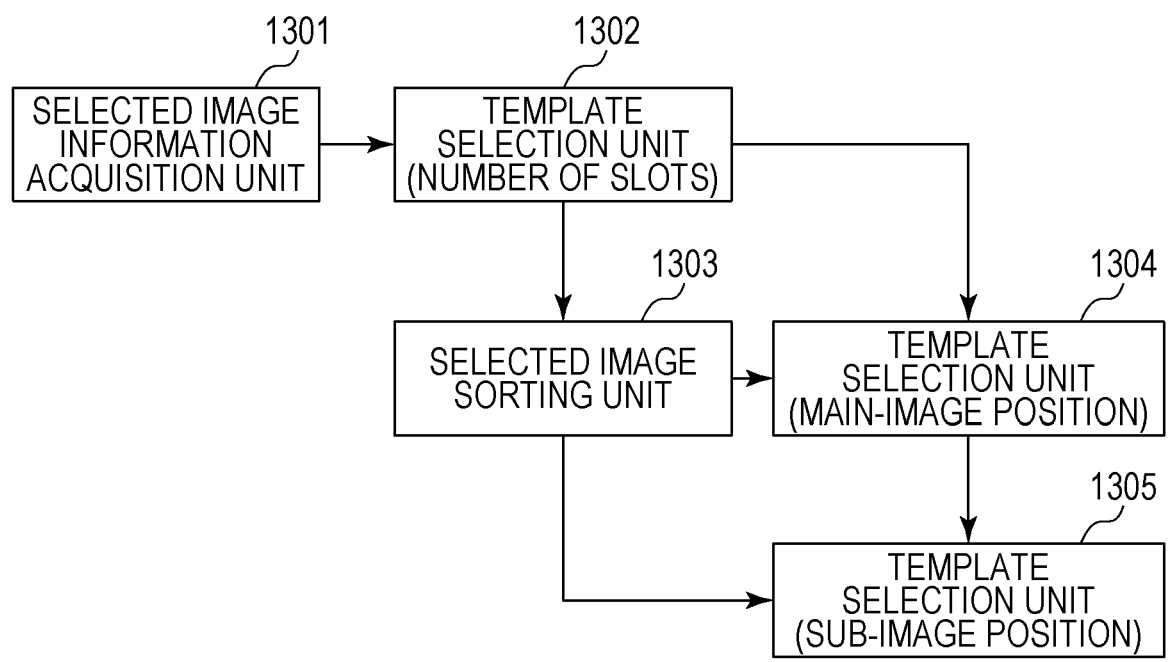
FIG. 13 is a block diagram illustrating a template setting unit in detail according to the present disclosure.

FIG. 13 is a block diagram of software that controls a template determination process and that is stored in the album creation application according to the present exemplary embodiment.

A selected image information acquisition unit 1301 acquires the number of image data selected in step S424 and the information regarding the selected image data. Examples of the information about the image data include the width and the height of the image represented by the image data, the image capture date and time information of the image data, and the score of the image data.

A template selection unit 1302 selects, from among the templates acquired in step S424, a template having slots equal in number to the plurality of image data selected in step S424.

A selected image sorting unit 1303 sorts the image data selected in step S424 in ascending order of image capture date and time.

A template selection unit 1304 selects a template suitable for the main image from among the templates selected by the template selection unit 1302. According to the present exemplary embodiment, as image data has an earlier capture date and time, the image data is placed in a slot closer to the upper left slot of the template. As image data has a later capture date and time, the image data is placed in a slot closer to the lower right slot. To place image data in this manner, the template selection unit 1304 selects, from among the selected templates, templates each having the main slot located at a position corresponding to the order of the capture date and time of the image data to be used as the main image among the image data selected in step S424 first. That is, if, for example, the order of the capture date and time of the image data to be used as the main image is third, the template selection unit 1304 selects a template having the main slot being the third slot from the left among all the slots. Note that since the image data are sorted by the selected image sorting unit 1303, the template selection unit 1304 can identify the order of the capture date and time of the image data to be used as the main image. Finally, the template selection unit 1305 selects, from among the templates selected in this manner, a template having a main slot with an aspect ratio that is the same as (or close to) the aspect ratio of the main image.

A template selection unit 1305 selects a template suitable for the sub-image from among the templates selected by the template selection unit 1304. More specifically, the template selection unit 1305 selects templates each having a subslot located at a position corresponding to the order of the capture date and time of the image data to be used as a sub-image among the image data selected in step S424 first. In addition, the template selection unit 1305 selects, from among the templates selected in this manner, a template having a subslot with an aspect ratio that is the same as (or close to) the aspect ratio of the sub-image.

Figure 14:
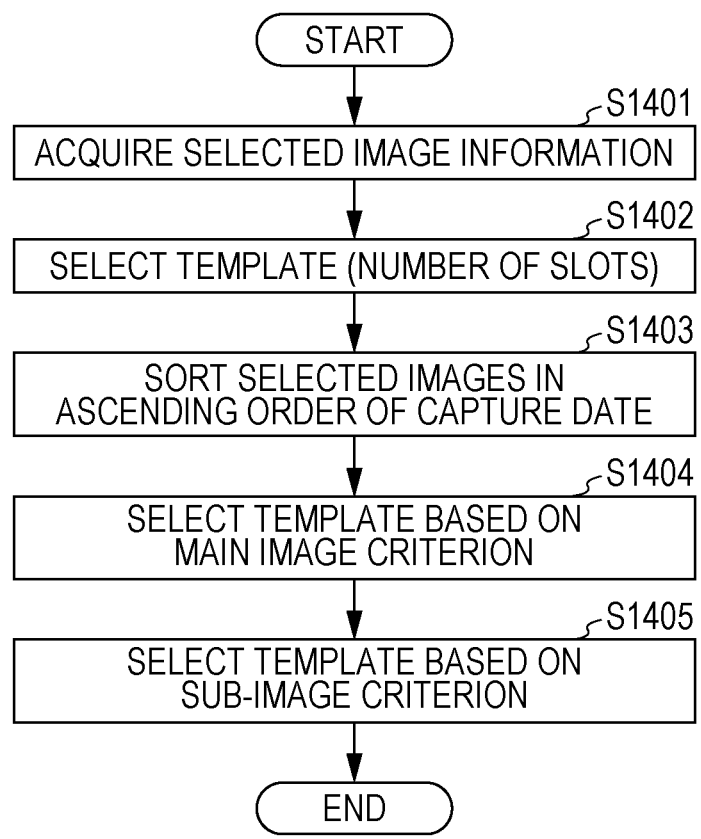
FIG. 14 illustrates a detailed process flow of a template setting step according to the present disclosure.

FIG. 14 is a flowchart illustrating a process of determining a template to be used for creating a layout image according to the present exemplary embodiment. The process in the flowchart illustrated in FIG. 14 is performed, for example, by the CPU 101 that loads a program corresponding to the album creation application stored in the HDD 104 onto the ROM 102 or the RAM 103 and executes the program.

In step S1401, by using the selected image information acquisition unit 1301, the CPU 101 acquires the number of image data selected in step S424 and the information regarding the selected image data first. In this example, the number of image data selected in step S424 is three. The details of this process have already been given in the above description of the selected image information acquisition unit 1301.

In step S1402, by using the template selection unit 1302, the CPU 101 selects a template having slots equal in number to the image data selected in step S424. Since the number of image data selected in step S424 is three, a template having three slots is selected. In this example, it is assumed that templates (1-1) to (4-4) illustrated in FIG. 10A are selected as the templates each having three slots.

Figure 10B:
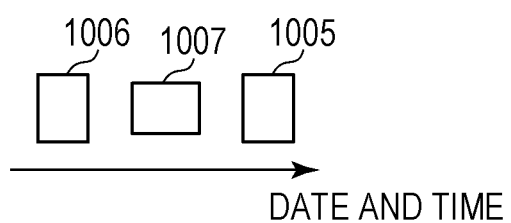

In step S1403, by using the selected image sorting unit 1303, the CPU 101 sorts the image data selected in step S424 in ascending order of image capture date and time. In this example, it is assumed that the images represented by the three image data have the image capture dates and times in the order as illustrated in FIG. 10B. In addition, in this example, an image 1005 is an image for the main slot (a main image), and the images 1006 and 1007 are images for the subslots (sub-images).

In step S1404, by using the template selection unit 1304, the CPU 101 selects a template suitable for the main image from among the templates selected by the template selection unit 1302. The details of this process have already been given in the above description of the template selection unit 1304. As described above, according to the present exemplary embodiment, as image data has an earlier capture date and time, the image data is placed in a slot closer to the upper left slot of the template. As image data has a later capture date and time, the image data is placed in a slot closer to the lower right slot. In addition, since the image 1005, which is a main image, has the most recent capture date and time and has a vertically elongated shape, the templates (3-1) to (3-4) illustrated in FIG. 10A are selected in this example.

In step S1405, by using the template selection unit 1305, the CPU 101 selects a template suitable for the sub-image among the templates selected in step S1404. The details of this process have already been given in the above description of the template selection unit 1305. The image 1006, which is one of the sub-images, has the earliest capture date and time and has a vertically elongated shape. In addition the image 1007, which is the other sub-image, has the second earliest capture date and time and has a horizontally elongated shape. Accordingly, the template (3-2) illustrated in FIG. 10A is selected. At the same time, it is determined which sub-image is placed in which sub-slot.

In this manner, in step S425, the CPU 101 determines which one of the templates is to be used for creating the layout image and which image is placed in which slot of the template. More specifically, the CPU 101 manages the information regarding each of the slots included in the selected template in association with the image data corresponding to the image placed in the slot.

In step S426, by using the image correction unit 217, the CPU 101 performs an image correction. If the setting indicating that the image correction is turned on is input from the image correction condition input unit 216, the CPU 101 performs an image correction. Examples of an image correction include a luminance correction, a red-eye correction, and a contrast correction. However, if the setting indicating that the image correction is turned off is input from the image correction condition input unit 216, the CPU 101 does not perform the image correction. That is, the processing directly proceeds from step S425 to step S427. An image correction can be performed on, for example, even image data that has 1200 pixels on the short side and that is converted into the sRGB color space.

In step S427, by using the layout information output unit 218, the CPU 101 generates the layout information. More specifically, the CPU 101 associates image data corresponding to each of the slots selected in step S425 and subjected to the image correction in step S426 with the slot and manages the image data. Note that the image used at this time is an analysis image generated in step S407. That is, the image is not the image used in steps S408 to S417. Thereafter, the CPU 101 generates bitmap data of the template having the images placed therein. At this time, the CPU 101 scales the image to be placed in accordance with the slot size information if the image does not fit the slot and places the image.

In step S428, it is determined whether the processes in steps S423 to S427 has been completed for all of the double-page spreads. If the processes have not been completed for all of the double-page spreads (No in step S428), the processing returns to step S423, where the processes in steps S423 to S427 are performed on the unprocessed double-page spreads. However, if the processes have not been completed for all of the double-page spreads (Yes in step S428), the automatic layout process is completed.

According to the present exemplary embodiment, by switching the images used for layout in accordance with the mode of the album, the layout including the major object of the specified mode can be created. In addition, the method for scoring and selecting the image data obtained by being cut out from the moving image is changed in accordance with the amount of motion and the score obtained at the time of moving image analysis. As a result, images can be selected on the basis of the result of moving image analysis and, thus, the layout can reflect the merits only a moving image could provide.

Result of Automatic Layout

Figure 16:
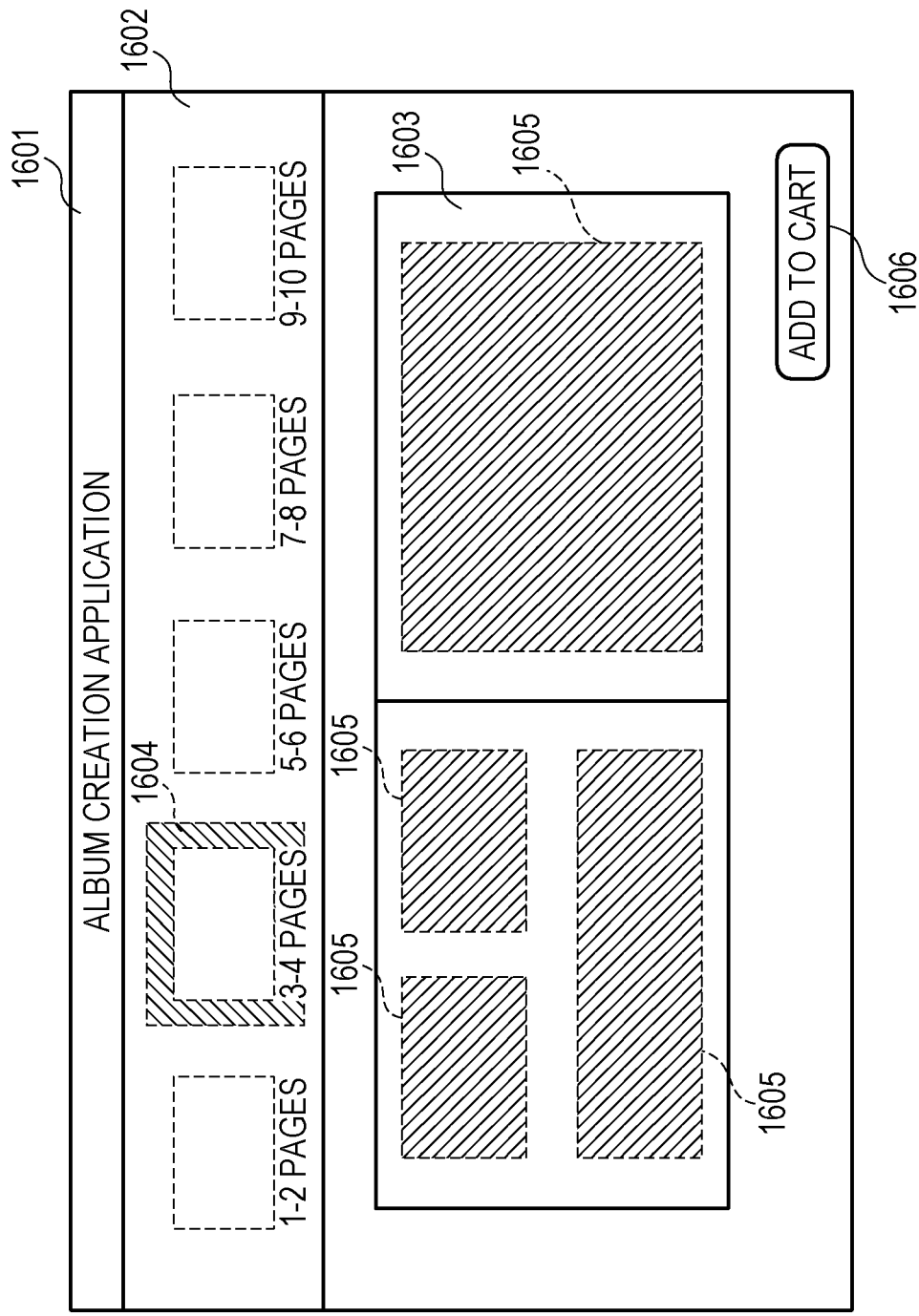
FIG. 16 is a schematic illustration of a display screen displaying the result of an automatic layout process according to the present disclosure.

Through the above-described processes, layout data is generated. The generated layout image is displayed on the display 105. FIG. 16 is a schematic illustration of a photo album indicating a layout image generated by the automatic layout process. In FIG. 16, a display area 1601 displayed by the photo album application includes a thumbnail display area 1602 in the upper section and a display area of a photo album 1603, which is the layout image, in the lower section. The thumbnail display area 1602 includes the thumbnails of the double-page spreads of the photo album.

When the user selects desired one of the thumbnails in the thumbnail display area 1602, the double-page spread corresponding to the thumbnail is selected, and the thumbnail is highlighted as a thumbnail 1604. At the same time, the selected double-page spread corresponding to the selected thumbnail 1604 is displayed as selected pages 1604 of the photo album 1603 in the lower section. In FIG. 16, pages 3 to 4 are selected pages 1604, and the pages are displayed in the display area of the photo album 1603. A photo selected in the layout process is allocated to a photo slot 1605. The edit operation to edit the photo album 1603 is enabled via this display screen.

Figure 15:
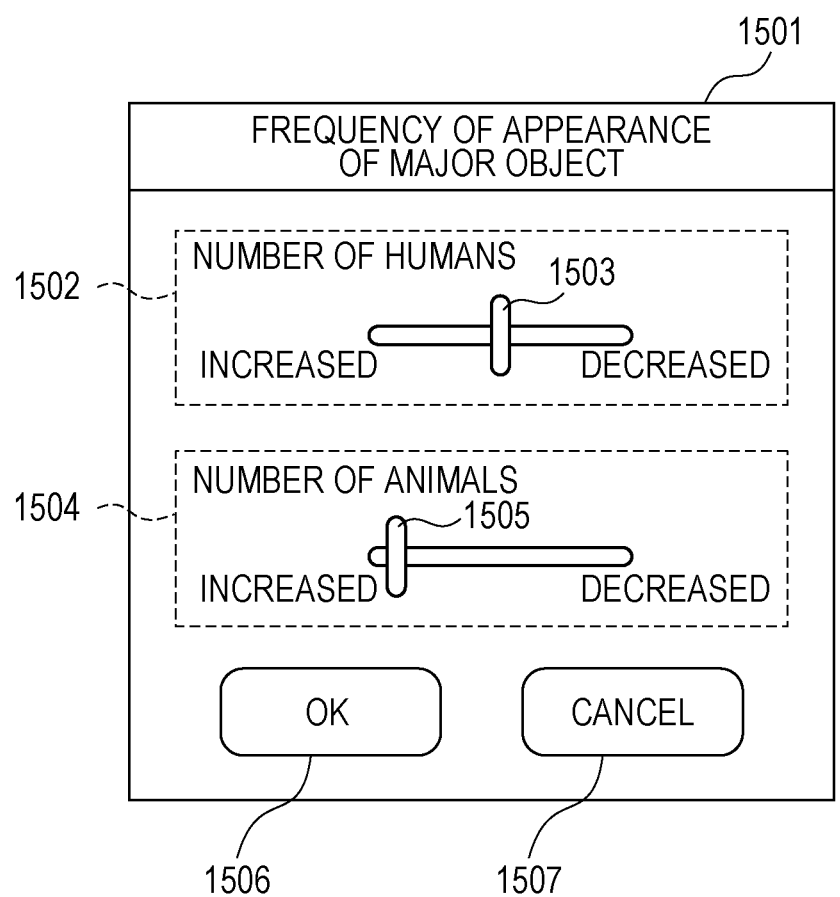
FIG. 15 is a schematic illustration of a display screen displayed by the application according to the present disclosure.

According to the present exemplary embodiment, as illustrated in FIG. 15, the edit screen for editing the layout image has a UI 1501 displayed therein. The UI 1501 is used to control the frequency of appearance of the main object in the edited album. The UI 1501 displays the information in accordance with the mode of the created album (the unedited album). More specifically, the UI 1501 displays a bar used to control the frequency of appearance of the image including the object corresponding to the mode in the edited album (the frequency of the image being selected as an image to be placed in the template). For example, if the mode of the created album is "animal", a bar 1504 used to control the frequency of appearance of the image including the object of "animal" in the edited album is displayed. According to the present exemplary embodiment, the design is such that a bar 1502 used to control the frequency of appearance of the image including the object of "human" in the edited album is displayed regardless of the mode of the album. In addition, according to the present exemplary embodiment, the design is such that the bar used to control the frequency of appearance of an image including an object other than "human" (i.e., an object of "animal" or "dishes") is displayed only when the album mode is "animal" or "dishes". However, the design is not limited thereto. The bar may be always displayed regardless of the mode of the album.

Hereinafter, description is given with reference to the mode of the created album being "animal". The user can control the frequency of appearance of the image including an object corresponding to each of the bars in the edited album by inputting the operation to move a drag handle 1503 or a drag handle 1505. According to the present exemplary embodiment, three setting values "more than normal", "normal", and "less than normal" are provided, and the frequency of appearance of each of the images is controlled in accordance with the setting value based on the user input (the setting value in accordance with the position of the drag handle 1503 or the drag handle 1505). When an OK button 1506 is pressed by the user, the album is edited on the basis of the setting conditions. That is, the automatic layout process is performed again on the basis of the setting conditions. More specifically, the processes in steps S416 to S428 are performed again. At this time, each of the pieces of information acquired by the processes in steps S401 to S415 at the time of creation of the album (the unedited album) is reused as appropriate. If the user presses a cancel button 1507, the controlled frequency of appearance is canceled, and the UI 1501 is closed. Note that for example, in the automatic layout process performed again, the processes in steps S423 to S428 may be performed again. In this case, in the image selection process performed in step S423, the score given at the time of album creation (the score given for the unedited album) in step S416 is referenced.

Furthermore, according to the present exemplary embodiment, an operation to replace an image with a new one (an image replacement operation) can be performed. The editing operation and the control relating to image replacement is described below with reference to FIG. 17 and FIGS. 23A and 23B.

After all of the editing operations are completed, the user selects a button 1606 to place an order for the edited photo album. By pressing this button, the edited album is uploaded into the shopping cart via the Internet. That is, the data of the photo album is uploaded to a server of a specific company connected via a network. Thus, the user can place an order for the photo album by using the shopping site provided by the company.

Image Replacement

Figure 17:
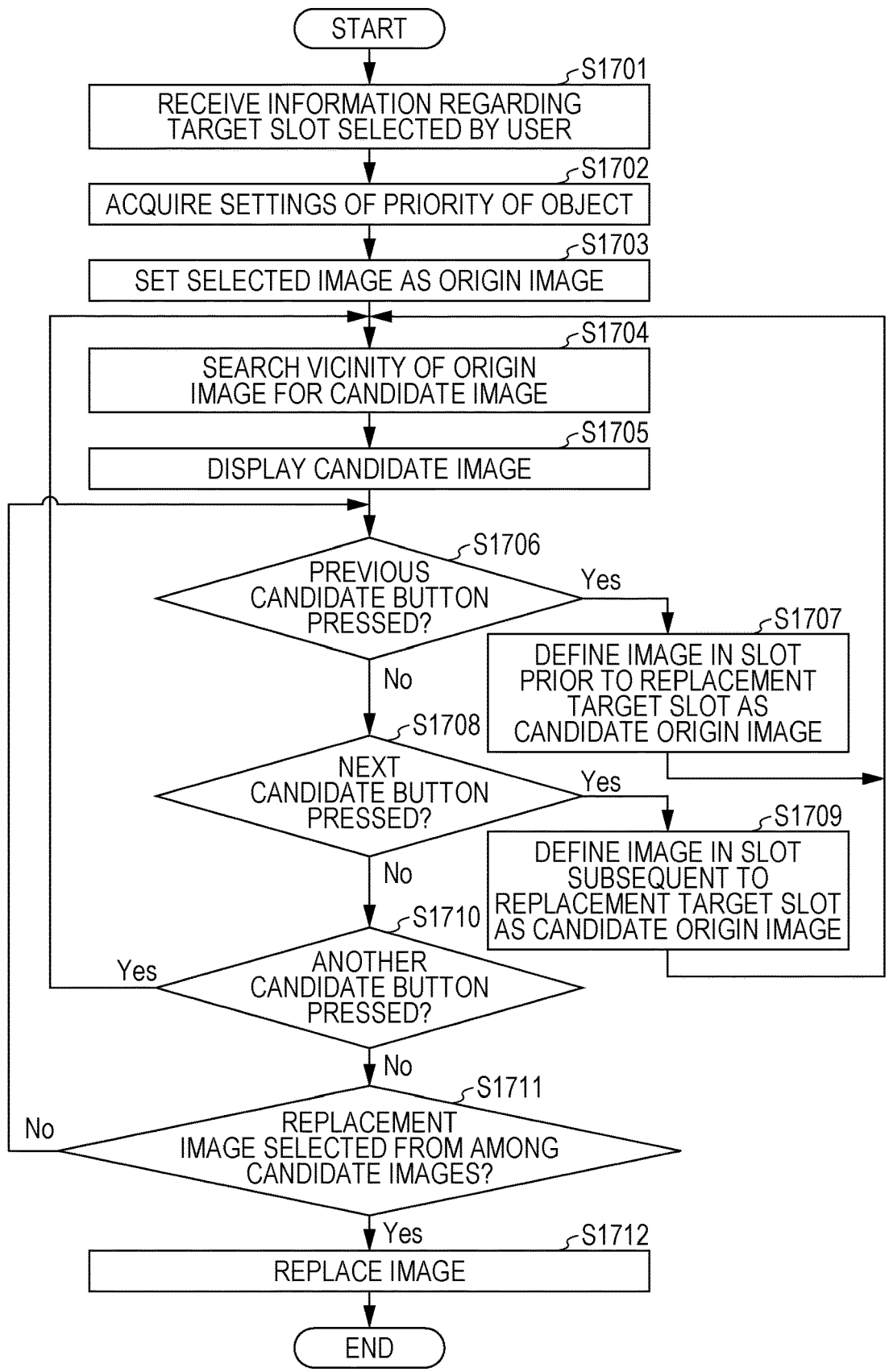
FIG. 17 illustrates a process flow of image replacement according to the present disclosure.

A method for replacing a placed image is described below. FIG. 17 is a flowchart of the image replacement control, which is performed by the CPU 101 functioning as an image replacement control unit (replacement candidate image search unit 220) (refer to FIG. 2).

In step S1701, the user selects an image (hereinafter also referred to as a "to-be-replaced image") that the user wants to replace to the other image first. At this time, the CPU 101 receives the information regarding the slot of the image selected by the user. More specifically, the user selects one of the images allocated to the plurality of slots 1605. In this process flow, it is assumed that an instruction to replace an image has already been input by the user before performing step 1701. In this example, if the user selects a UI component in the display screen (e.g., an image replacement button), replacement of an image is requested. The instruction may be input after the user selects an image that the user wants to replace. In such a case, when the user selects a predetermined image, an "image replacement" icon is displayed. If the user selects the "image replacement" item, the CPU 101 receives an image replacement request. Upon receiving the image replacement request, the CPU 101 acquires the position information of the slot of the image to be replaced and the information regarding the selected image. Examples of the acquired image information include the identification information, such as a personal ID and category information of an object contained in the image, and the score.

In step S1702, the CPU 101 acquires the setting information regarding the priority of a particular object. In this case, the setting information regarding the mode setting of an object described with reference to FIG. 3 is acquired. Thus, the information regarding the object having priority can be acquired.

In step S1703, the CPU 101 defines the selected image (to-be-replaced image) as an origin image (hereinafter referred to as a "candidate origin image") for searching for a replacement candidate image used for image replacement. In step S1704, the CPU 101 lists replacement candidate images obtained in the vicinity of the candidate origin image and searches for one of the replacement candidate images and extracts the replacement candidate image. The process to extract the replacement candidate image is described in more detail below with reference to FIGS. 19A and 19B. In the description below, a replacement candidate image is also simply referred to as a "candidate image".

Figure 18:
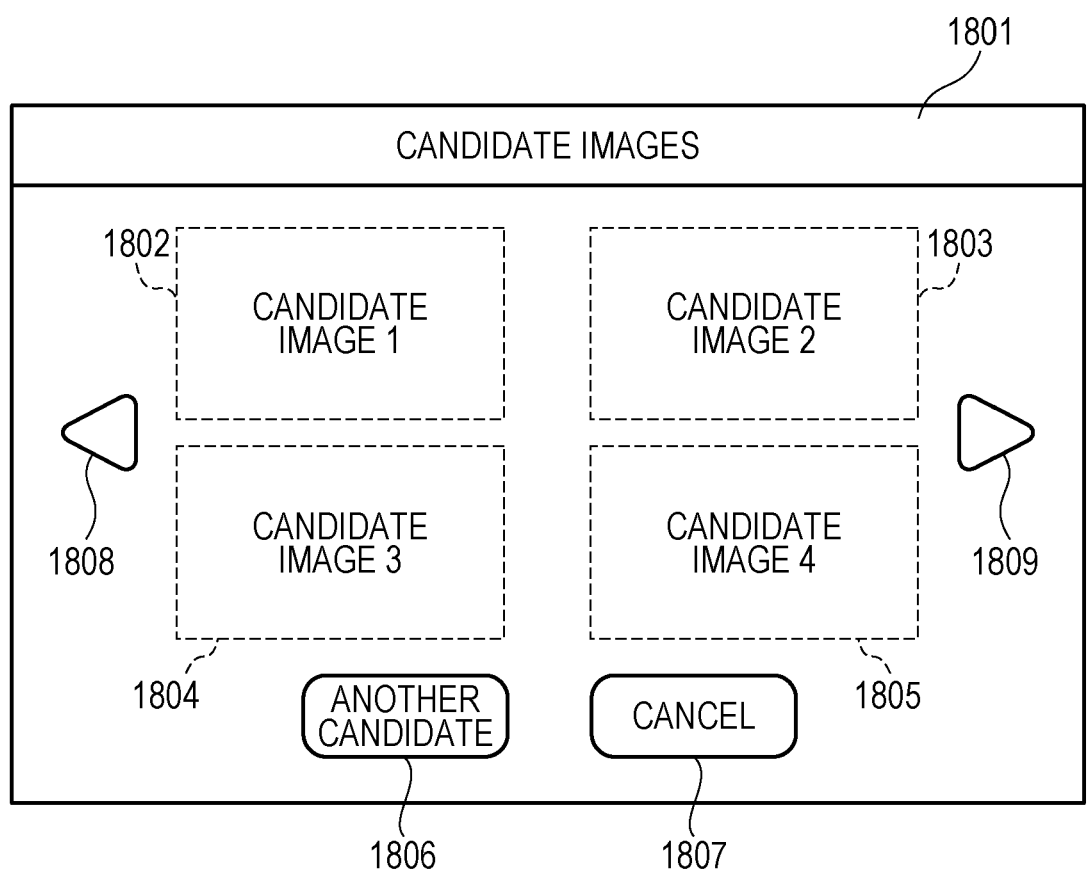
FIG. 18 is a schematic illustration of a display screen displaying replacement candidate images according to the present disclosure.

In step S1705, the result of extraction in step S1704 is displayed as a candidate image for image replacement. FIG. 18 illustrates an example of user interface 1801 displayed in step S1705. The user interface 1801 for presenting the candidate images displays four candidate images 1802 to 1805 extracted in step S1704. In addition, the following two buttons are provided: a button 1808 used to display the candidate image in the slot prior to the slot for replacement (hereinafter referred to as a "previous candidate button") and a button 1809 used to display the candidate image in the slot subsequent to the slot for replacement (hereinafter referred to as the next candidate button). Furthermore, the following two buttons are provided: an "another candidate" button 1806 used to request change of the candidate image and a cancel button 1807 used to cancel the replacement operation.

In step S1706, the CPU 101 determines whether the previous candidate button 1808 is selected. If the previous candidate button 1808 is selected (YES in step S1706), the processing proceeds to step S1707, where the CPU 101 defines, as the candidate origin image, the image allocated to the slot located prior to the slot for replacement.

However, if, in step S1706, the previous candidate button 1808 is not selected (NO in step S1706), the process proceeds to step S1708, where the CPU 101 determines whether the next candidate button 1809 is selected. If, in step S1708, the CPU 101 determines that the next candidate button 1809 is selected (YES in step S1708), the processing proceeds to step S1709, where the image allocated to the slot located subsequent to the slot for replacement originally selected by the user is defined as the candidate origin image.

If, in step S1708, the next candidate button 1809 is not selected (NO in step S1708), the processing proceeds to step S1710, where the CPU 101 determines whether the "another candidate" button 1806 is selected. If, in step S1710, the "another candidate" button 1806 is selected (YES in step S1710), the CPU 101 determines that a candidate image that the user desires is not found, and the processing returns to step S1704. In step S1704, candidate images are searched for again. At this time, the CPU 101 searches for candidate images excluding the images that were previously selected as the candidate images.

However, if, in step S1710, the "another candidate" button 1806 is not selected (NO in step S1710), the processing proceeds to step S1711, where the CPU 101 determines whether one of the candidate images 1802 to 1805 has been selected by the user. If, in step S1711, one of the candidate images is selected (YES in step S1711), the CPU 101 determines that a candidate image desired by the user is found, and the processing proceeds to step S1712. However, if, in S1711, the determination is NO, the processing returns to step S1706 again.

In step S1712, the CPU 101 allocates the candidate image selected by the user to the slot for replacement. In addition, in step S1712, the CPU 101 displays, in the display screen, a new layout image in which the selected image is allocated to the slot. By forming the loop from steps S1706 to S1711, the CPU 101 can wait for the next processing until receiving an instruction from the user. Although not illustrated in FIG. 17, if the cancel button 1807 is pressed by the user, the CPU 101 can interrupt the series of image replacement processes at this time.

Details of Extraction Process of Replacement Candidate Images

Figure 19A:
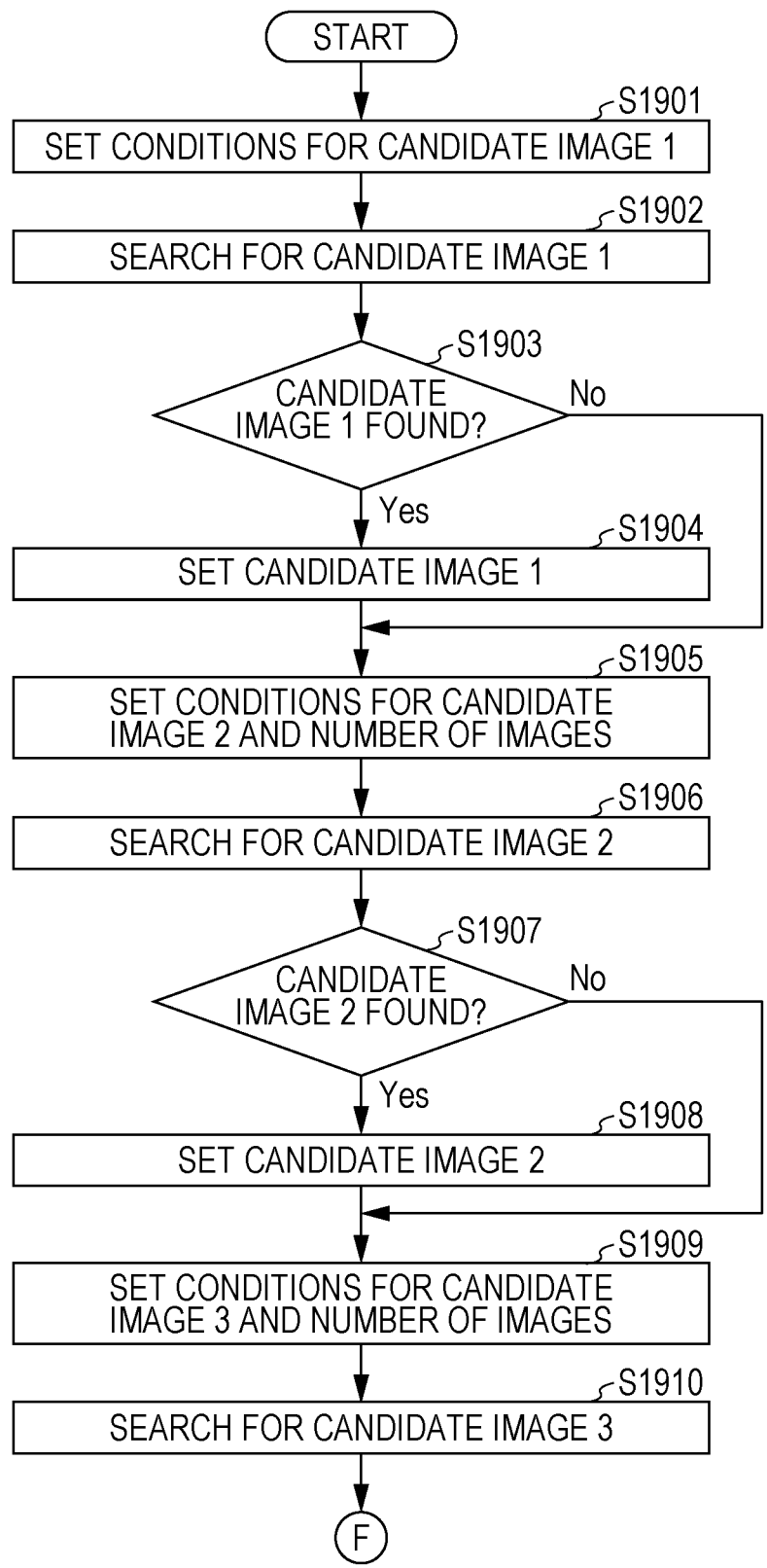
FIGS. 19A and 19B illustrates a detailed process flow of search for replacement candidate images according to the present disclosure.
Figure 19B:
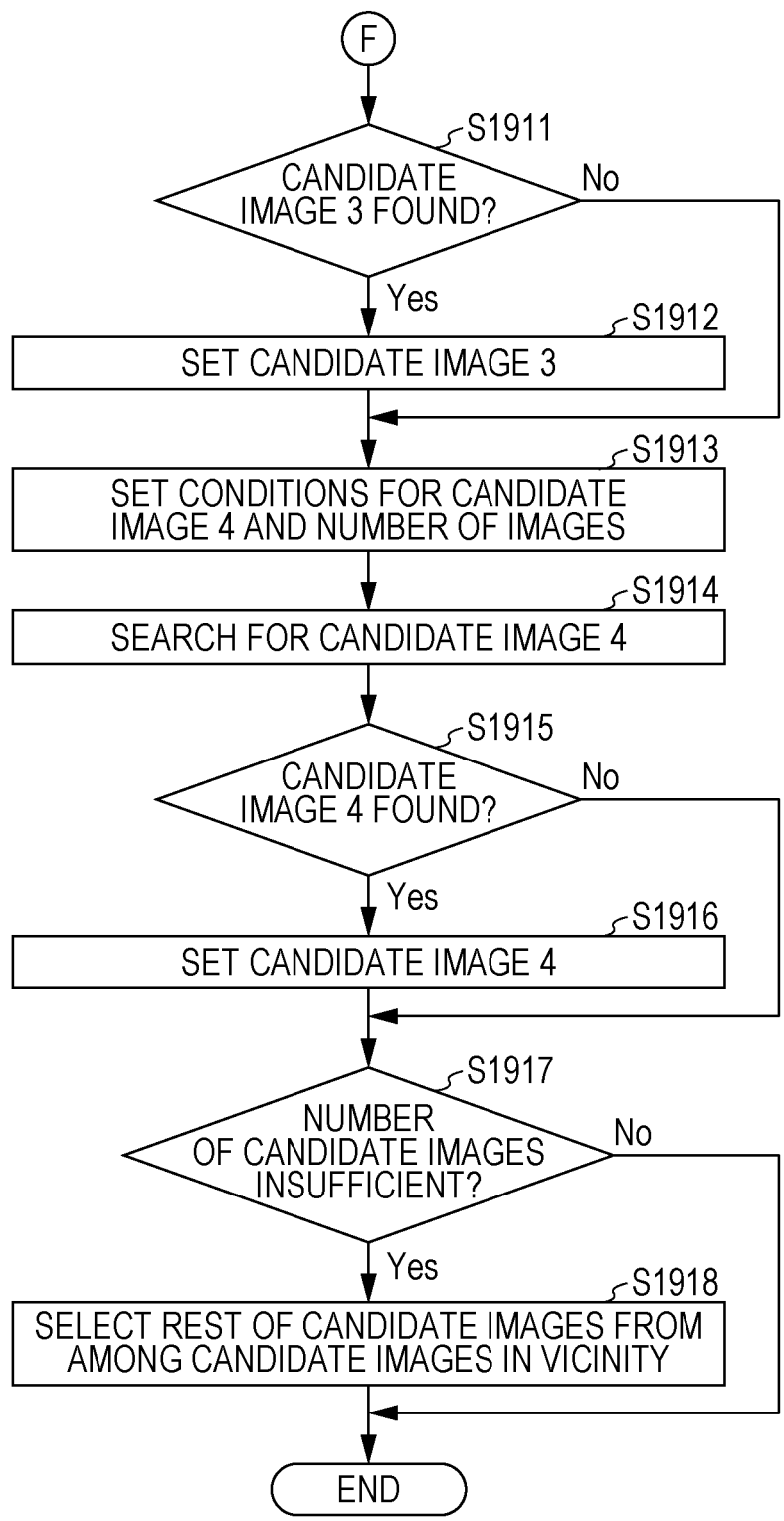

The process flow relating to extraction of replacement candidate images is described below with reference to FIGS. 19A and 19B. FIGS. 19A and 19B are flowcharts illustrating the details of the process performed in step S1704. In step S1704, the CPU 101 searches the images in the temporal vicinity of the candidate origin image for candidate images and extracts the candidate images. As used herein, the term "images in the temporal vicinity" refers to any sub-image group located within the capture date and time sub-range corresponding to a lot (as illustrated in FIGS. 9A to 9I) or an image group that is within a predetermined period of time.

In FIGS. 19A and 19B, four candidate images are extracted as in FIG. 18, and the four candidate images are extracted by using the extraction conditions denoted in the condition table illustrated in FIG. 20. FIG. 20 is a table denoting the extraction conditions used in the case where the mode specifying unit 307 illustrated in FIG. 3 takes into consideration the setting relating to the priority of the main object specified by the user. For example, if "human" illustrated in FIG. 3 is selected in the mode specifying unit 307, the extraction condition set forth in the row "human" in FIG. 20 is used. In contrast, if "animal" illustrated in FIG. 3 is selected in the mode specifying unit 307, the extraction condition in the row "animal" in FIG. 20 is used. As described above, different extraction conditions are used in different modes ("human" and "animal").

As illustrated in FIGS. 19A and 19B, in step S1901, the settings relating to the priority of the object (the mode information of the object having priority) are acquired first, and the extraction condition of a candidate image 1 is determined by using the setting relating to the priority and the table illustrated in FIG. 20. Hereinafter, description is given on the assumption that "animal" is selected as the priority mode. Referring to FIG. 20, when the mode is "animal", the extraction condition of the candidate image 1 is "human and animal". Accordingly, to extract an image as the candidate image 1, the CPU 101 sets the condition that an image includes both a human and an animal.

Subsequently, in step S1902, the CPU 101 searches for images on the basis of the extraction condition set in step S1901. In step S1903, the CPU 101 determines whether as a result of the search in step S1902, an image that meets the condition has been extracted. If, in step S1903, an image that meets the condition has been extracted (YES in step S1902), the processing proceeds to step S1904, where the image extracted in step S1902 is set as the replacement candidate image 1. Thereafter, the processing proceeds to step S1905. However, if, in step S1903, an image that meets the condition has not been found (NO in step S1902), the processing directly proceeds to step S1905.

In step S1905, the CPU 101 sets the extraction condition and the number of images to extract the candidate image 2. As can be seen from FIG. 20, the extraction condition for the candidate image 2 is "animal". Accordingly, to extract an image as the candidate image 2, the CPU 101 sets the condition that an image includes an animal and does not include a human. Note that the number of images to be extracted is changed in accordance with the extraction result of the candidate image 1. For example, if the candidate image 1 is extracted in step S1903, the number of candidate images 2 to be extracted is one. However, if the candidate image 1 is not extracted in step S1903, the number of candidate images 2 to be extracted is set to two. That is, if the image that meets a first extraction condition is not found, the number of images that meet a second extraction condition is increased so that four candidate images are finally extracted and presented to the user.

In step S1906, images are searched for on the basis of the extraction conditions and the number of images to be extracted set in step S1905. In step S1907, the CPU 101 determines whether an image that meets the extraction condition has been extracted. If an image that meets the condition has been extracted in step S1906 (YES in step S1907), the processing proceeds to step S1908, where the extracted image is set as the candidate image 2. Thereafter, the process proceeds to step S1909. However, if, in step S1906, an image that meets the condition has not been found (NO in step S1907), the processing directly proceeds to step S1909.

In step S1909, the CPU 101 sets the extraction condition and the number of images to extract the candidate image 3. As can be seen from FIG. 20, the extraction condition of the candidate image 3 is "human". Accordingly, the CPU 101 sets the condition that an image includes a human and does not include an animal as the extraction condition of the candidate image 3. Note that the number of images to be extracted is changed in accordance with the extraction results of the candidate image 1 and candidate image 2. More specifically, the number of candidate images 3 to be extracted varies between a maximum of three and a minimum of one in accordance with the search results of the candidate image 1 and candidate image 2.

In step S1910, the CPU 101 searches for images on the basis of the extraction conditions set in step S1909. In step S1911, the CPU 101 determines whether an image that meets the extraction condition has been extracted. If, in step S1910, an image that meets the condition is extracted (YES in step S1911), the processing proceeds to step S1912, where the extracted image is set as the candidate image 3. Thereafter, the processing proceeds to step S1913. However, if an image that meets the condition has not been found in step S1910 (NO in step S1911), the processing directly proceeds to step S1913.

In step S1913, the CPU 101 sets the extraction condition and the number of images to extract the candidate image 4. As can be seen from FIG. 20, the extraction condition of the candidate image 4 is "thing". The condition "thing" indicates that an image does not include neither a human nor an animal. Accordingly, the CPU 101 sets a condition that an image includes neither a human nor an animal as the extraction condition of the candidate image 4. The number of images to be extracted is changed in accordance with the extraction results of the candidate images 1, 2, and 3. More specifically, the number of candidate images 4 to be extracted varies between a maximum of four and a minimum of one in accordance with the search results of the candidate images 1, 2, and 3.

In step S1914, the CPU 101 searches images by using the extraction conditions set in step S1913. In step S1915, the CPU 101 determines whether an image that meets the extraction condition has been extracted. If an image that meets the condition has been extracted in step S1914 (YES in step S1915), the processing proceeds to step S1916. In step S1916, the extracted image is defined as the candidate image 4, and the processing proceeds to step S1917. However, if an image that meets the condition has not been found in step S1914 (NO in step S1915), the processing directly proceeds to step S1917.

In step S1917, the CPU 101 determines whether the number of candidate images is insufficient. In this example, if four images are extracted (NO in step S1917), the CPU 101 determines that the number of candidate images is sufficient and completes the processing. However, if the number of images is less than four (YES in step S1917), the processing proceeds to step S1918, where the rest of the candidate images are selected from the images in the vicinity of the candidate origin image. In this case, the extraction condition can be that images are sequentially selected in order of the capture date and time from the image having the capture date and time the closest to that of the image placed in the slot for image replacement.

As described above, by extracting the replacement candidate image on the basis of the priority of the object, a predetermined number of replacement candidate images that match the user's preference can be presented to the user. For example, the candidate images reflect the user's preference to the object more than the candidate images extracted from among the images in the predetermined period on the basis of only the capture date or creation date. Note that the score given to an image can be used as the extraction condition. In this case, the images with high scores reflect the user's preference on some level. However, all the images with high scores do not have a high priority of an object that the user assigns. For example, even if the user has set "animal" in the priority mode, there may be cases in which the image including only a human has a higher score than the image including an animal in the image group to be searched. In this case, by using, as the extraction condition of a candidate image, the setting relating to the priority of a particular object as in the present exemplary embodiment, determination as to whether the particular object is included in the image is given priority over the score of the image. As a result, the priority of an object that the user assigns is reflected more.

While the above description has been given with reference to selection of four candidate images, the number of candidate images is not limited thereto. For a device with a small display area, such as a smartphone, the number of candidate images may be two or may be varied in accordance with the display capability of the display. Alternatively, if the number of original images among which the user specifies images that form a photo album is small, it is difficult to search for candidate images on the basis of a plurality of conditions. In this case, the conditions and the number of candidates may be controlled in accordance with the total number of images. Also note that the extraction conditions are not limited to the conditions illustrated in FIG. 20. The extraction condition of the candidate image 1 may be that an image includes an animal but does not include a human. Thus, the extraction condition can be any condition if the priority of the object is reflected.

In addition, in the case where candidate images are extracted, if a number of images that match the extraction condition are extracted more than the specified number of extracted images, the images having top scores can be selected from among the plurality of images. For example, if five images that meet the extraction condition are found in extracting two candidate images 2, two images having top two score can be extracted as the candidate images 2 from among the five images.

Modification Relating to Details of Replacement Candidate Image Extraction Process Furthermore, the setting based on the priority of a particular object is not limited to the above-described mode selection of a specific object. For example, as illustrated in FIG. 15, the setting relating to the frequency of appearance of a specific object may be used as the setting based on the priority. The extraction process is described below with reference to FIG. 15 on the assumption that the number of persons is specified as "normal" and the number of animals is specified as "more than normal".

FIG. 21 illustrates an example of a table denoting the setting of the frequency of appearance in FIG. 15 serving as the setting of a priority. The table is referenced when the extraction condition of the replacement candidate image is set. As illustrated in FIG. 21, when the number of humans is "normal" and the number of animals is "more than normal", "yes" is set for both human and animal in the extraction condition of the candidate images 1 and 2. Accordingly, the extraction conditions of the candidate images 1 and 2 are that an image includes both a human and an animal. Since "no" is set for human and "yes" is set for animal in extraction condition of the candidate image 3, the extraction condition of the candidate image 3 is that an image does not include a human but includes an animal. Since "no" is set for both human and animal in extraction condition of the candidate image 4, the extraction condition of the candidate image 4 is that an image includes neither a human nor an animal.

In this manner, even when as illustrated in FIG. 15, the setting relating to the frequency of appearance of an object is used, four candidate images can be extracted in accordance with the process flow illustrated in FIGS. 19A and 19B by using the extraction condition illustrated in FIG. 21. Note that the extraction condition used when the frequency of appearance is set is not limited thereto. Any extraction condition can be set if the setting of the frequency of appearance serving as the priority of the object is reflected.

As illustrated in FIG. 3, the priority mode is set on one of three objects "human", "animal", and "dishes". In addition, as illustrated in FIG. 15, the setting relating to the frequencies of appearance of two objects (human and animal) is made. However, the setting on another object may be made. That is, by using image recognition technology, another object can be recognized. Thus, the settings of the priority mode and the frequency of appearance can be made on another object. For example, the family structure can be deduced from the result of recognition of the individual persons. As described above, when creating an album using the image recognition result of many types of objects, the frequency of appearance of each of the types of objects can be controlled.

However, if a control user interface is displayed for each of a plurality of main objects to be recognized, a large number of display areas are required and, thus, the operability may decrease. Therefore, by using the result of image recognition of the images some of which the user specifies to create a photo album, the user interfaces for only the recognized major objects in the images can be displayed.

Figure 22:
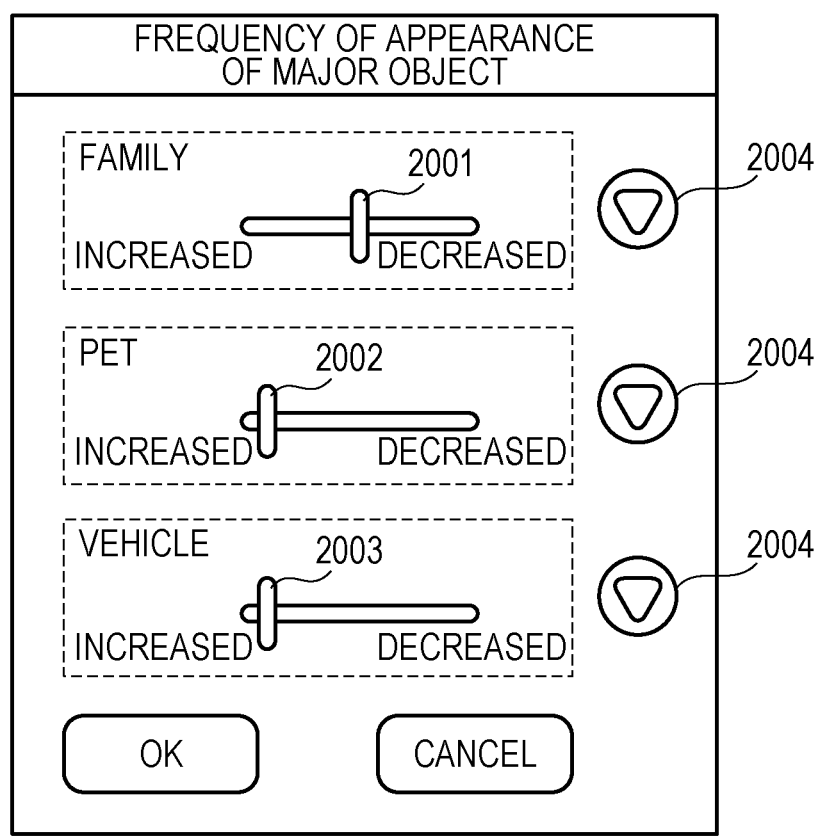
FIG. 22 is a schematic illustration of a display screen displayed by an application according to the present disclosure.

For example, assume that image recognition is performed on the basis of categories of a human, a dog, a cat, a car, a train, furniture, and foods, and objects of the categories of a human, a dog, and a car are recognized (identified). In addition, assume that personal recognition is performed on the basis of the recognized humans, and each of the persons is recognized. Furthermore, assume that an object of a category of a family is recognized based on the fact that family members frequently appear in the same image or base on a family structure specified by the user. In this case, as illustrated in FIG. 22, the recognized main objects are classified into categories (groups), and the user interfaces for performing control on a category basis can be displayed. FIG. 22 illustrates an example in which the category "family" is created from the result of personal recognition, the category "pet" is created from dogs, and the category "vehicle" is created from cars. When an object serving as a category includes major objects serving as individual members of the object, an expansion button 2004 is provided next to each of the slider bars 2001, 2002, and 2003 each provided for one of the categories. If the expansion button 2004 is selected, the user interface is changed to a user interface in which the contents of the category are expanded.

Figure 23A:
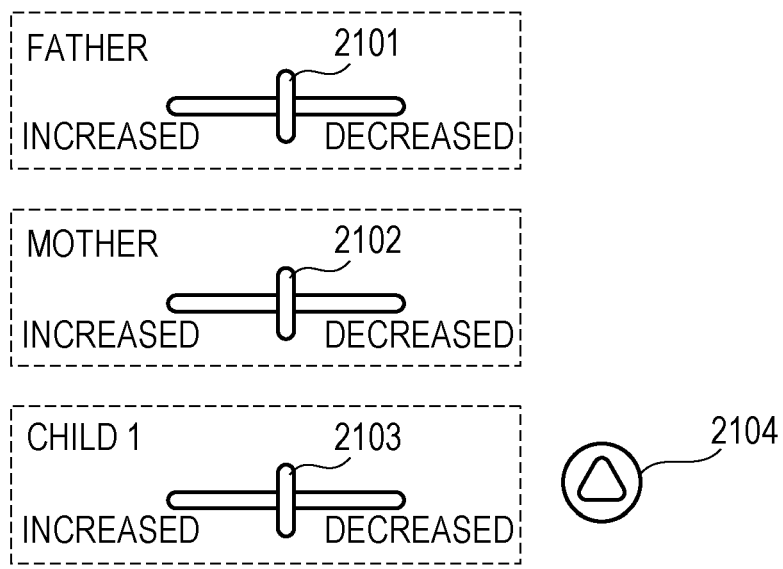
FIGS. 23A and 23B are schematic illustrations of display screens displayed by the application according to the present disclosure.
Figure 23B:
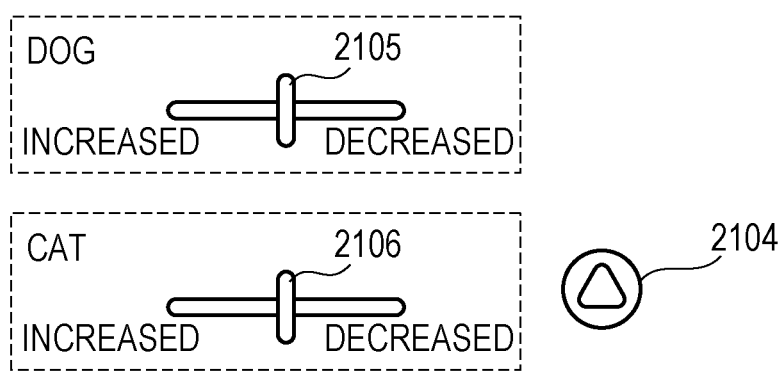

FIGS. 23A and 23B are schematic illustrations of the user interfaces after expansion. FIG. 23A illustrates slider bars 2101, 2102, and 2103 each for one of the person-based main objects included in the family group. The slider bars are displayed when the expansion button 2004 is pressed. An example in which the user interface for three persons, that is, "father", "mother", and "child 1" is displayed is illustrated in FIG. 23A. The user interfaces include a return button 2104. If the return button 2104 is pressed, the current user interface returns to the original user interface (the screen displaying the user interface illustrated in FIG. 22). FIG. 23B illustrates another example in the case of a pet group. When pets are classified into dogs and cats and if the expansion button 2004 is pressed, the user interface illustrated in FIG. 23B is displayed. In this manner, the display area can be efficiently used. At the same time, the operability can be improved.

Another Embodiment

The present invention is not limited to the above-described exemplary embodiments. For example, while the above-described exemplary embodiment has been described with reference to the album creation application, the technique is applicable to an application and an image processing apparatus having an image selection process for automatically selecting recommended images.

In addition, while the description of FIG. 1 has been given with reference to the image processing apparatus operating in a local environment, the environment in which the image processing apparatus operates is not limited thereto. For example, the image processing apparatus may be an apparatus operating on a server. In this case, images stored in the server may be used, or images may be uploaded to the server.

While the above embodiment has been described with reference to the images being photos and grouping based on the capture date and time, the grouping may be performed on the basis of the image creation date and time.

According to the above-described embodiment, in terms of the setting relating to the priority of an object, the user specifies the mode or the frequency of appearance of an object, and the replacement candidate image is extracted on the basis of the specified mode or the specified frequency of appearance of the object. However, the mode or the frequency of appearance may be automatically set on the basis of, for example, the distribution of the types of objects included in an image group obtained by analyzing the image group used to create the album.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-239739 filed Dec. 9, 2016, which is hereby incorporated by reference herein in its entirety.

What is claimed is:

1. An image processing method executed by at least one processor in an information processing apparatus, the method comprising:
    performing an object identification process on a plurality of image data;
    acquiring setting information relating to a priority mode;
    generating layout data in which at least some of the plurality of image data subjected to the identification process are arranged in template data, wherein, in a case where the priority mode is a first mode, an image including a first object is preferentially arranged, and in a case where the priority mode is a second mode, an image including a second object different from the first object is preferentially arranged;
    causing a display to display a layout image on a basis of the layout data;
    accepting selection of a replacement target image in the displayed layout image, from a user;
    setting an extracting condition based on the priority mode, wherein, in a case where the priority mode is the first mode, an extracting condition for preferentially extracting a replacement candidate image including the first object is set, and in a case where the priority mode is the second mode, an extracting condition for preferentially extracting a replacement candidate image including the second object is set;
    extracting a replacement candidate image based on the set extracting condition; and
    replacing the selected replacement target image with the replacement candidate image.

2. The image processing method according to claim 1, further comprising:
    assigning, to an image including the particular object, identification information indicating the particular object on a basis of a result of the identification process,
    wherein in the extracting a replacement candidate image, the replacement candidate image is extracted on a basis of the setting information relating to the priority and the identification information.

3. The image processing method according to claim 2, further comprising:
    assigning a score based on at least the template data to each of the plurality of image data subjected to the identification process,
    wherein in generating layout data, the layout data is generated on a basis of the assigned score, and
    wherein in the extracting a replacement candidate image, if a plurality of images extractable on a basis of the setting information relating to a priority and the identification information are present, the replacement candidate image is extracted by further using the assigned score.

4. The image processing method according to claim 1, wherein in the extracting a replacement candidate image, a plurality of the replacement candidate images are extractable on a basis of a plurality of extraction conditions, and
    wherein a number of the replacement candidate images extracted on a basis of a second extraction condition varies with the result of extraction of the replacement candidate images based on a first extraction condition.

5. The image processing method according to claim 1, wherein in acquiring setting information, setting information of a priority mode to cause the particular object to preferentially appear is acquired as the setting information relating to a priority.

6. The image processing method according to claim 1, wherein in acquiring setting information, setting information relating to a frequency of appearance of the particular object is acquired as the setting information relating to a priority, and
    wherein in the extracting a replacement candidate image, the replacement candidate image is extracted on a basis of the setting information relating to the frequency of appearance of the particular object.

7. The image processing method according to claim 1, wherein a plurality of extracted replacement candidate images are displayed, and
    wherein in replacing an image, the selected replacement target image is replaced with an image selected from among the plurality of replacement candidate images by a user.

8. The image processing method according to claim 1, wherein the particular object is a particular individual.

9. The image processing method according to claim 1, wherein the object is one of categories into which individuals are classified.

10. A non-transitory computer-readable storage medium storing a computer program causing a computer to perform an image processing method comprising:
    performing an object identification process on a plurality of image data;
    acquiring setting information relating to a priority mode;
    generating layout data in which at least some of the plurality of image data subjected to the identification process are arranged in template data, wherein, in a case where the priority mode is a first mode, an image including a first object is preferentially arranged, and in a case where the priority mode is a second mode, an image including a second object different from the first object is preferentially arranged;

causing a display to display a layout image on a basis of the layout data;

accepting selection of a replacement target image in the displayed layout image, from a user;

setting an extracting condition based on the priority mode, wherein, in a case where the priority mode is the first mode, an extracting condition for preferentially extracting a replacement candidate image including the first object is set, and in a case where the priority mode is the second mode, an extracting condition for preferentially extracting a replacement candidate image including the second object is set;

extracting a replacement candidate image based on the set extracting condition; and replacing the selected replacement target image with the replacement candidate image.

11. An image processing apparatus comprising:

an identification unit configured to perform an object identification process on a plurality of image data;

an acquiring unit configured to acquire setting information relating to a priority mode;

a generation unit configured to generate layout data in which at least some of the plurality of image data subjected to the identification process performed by the identification unit are arranged in template data, wherein, in a case where the priority mode is a first mode, an image including a first object is preferentially arranged, and in a case where the priority mode is a second mode, an image including a second object different from the first object is preferentially arranged;

a display control unit configured to cause a display to display a layout image on a basis of the layout data;

an acceptance unit configured to accept selection of a replacement target image in the displayed layout image, from a user;

a setting unit configured to set an extracting condition based on the priority mode, wherein, in a case where the priority mode is the first mode, an extracting condition for preferentially extracting a replacement candidate image including the first object is set, and in a case where the priority mode is the second mode, an extracting condition for preferentially extracting a replacement candidate image including the second object is set;

an extraction unit configured to extract a replacement candidate image based on the set extracting condition; and a replacement unit configured to replace the selected replacement target image with the replacement candidate image.

12. The image processing apparatus according to claim 11, further comprising:

an assigning unit configured to assign, to an image including the particular object, identification information indicating the particular object on a basis of a result of the identification process, wherein the extraction unit extracts the replacement candidate image on a basis of the setting information relating to a priority and the identification information.

13. The image processing apparatus according to claim 12, further comprising:

a scoring unit configured to assign a score based on at least the template data to each of the plurality of image data subjected to the identification process, wherein the generation unit generates the layout data on a basis of the score assigned by the scoring unit, and wherein if a plurality of images extractable on a basis of the setting information relating to a priority and the identification information are present, the extraction unit extracts the replacement candidate image by further using the score assigned by the scoring unit.

14. The image processing apparatus according to claim 11, wherein the extraction unit is capable of extracting a plurality of the replacement candidate images on a basis of a plurality of extraction conditions, and wherein a number of the replacement candidate images extracted on a basis of a second extraction condition varies with the result of extraction of the replacement candidate images based on a first extraction condition.

15. The image processing apparatus according to claim 11, wherein the setting acquisition unit acquires, as the setting information relating to a priority, setting information of a priority mode to cause the particular object to preferentially appear.

16. The image processing apparatus according to claim 11, wherein the setting acquisition unit receives, as the setting information relating to a priority, setting information relating to a frequency of appearance of the particular object, and wherein the extraction unit extracts the replacement candidate image on a basis of the setting information relating to the frequency of appearance of the particular object.

17. The image processing apparatus according to claim 11, further comprising:

a replacement unit configured to replace an image, wherein the display control unit displays the plurality of replacement candidate images extracted by the extraction unit, and wherein the replacement unit replaces an image to be replaced in the layout image with an image selected from among the plurality of replacement candidate images by a user.

18. The image processing apparatus according to claim 11, wherein the particular object is a particular individual.

19. The image processing apparatus according to claim 11, wherein the object is one of categories into which individuals are classified.

* * * * *